United States Patent
Glasser

(10) Patent No.: US 9,590,837 B2
(45) Date of Patent: *Mar. 7, 2017

(54) INTERACTION OF USER DEVICES AND SERVERS IN AN ENVIRONMENT

(71) Applicant: ExXothermic, Inc., Saratoga, CA (US)

(72) Inventor: Lance A. Glasser, Saratoga, CA (US)

(73) Assignee: ExXothermic, Inc., Saratoga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/940,115

(22) Filed: Jul. 11, 2013

(65) Prior Publication Data

US 2013/0304804 A1 Nov. 14, 2013

Related U.S. Application Data

(63) Continuation of application No. 13/556,461, filed on Jul. 24, 2012, now Pat. No. 8,495,236.

(60) Provisional application No. 61/604,693, filed on Feb. 29, 2012.

(51) Int. Cl.

| | |
|---|---|
| *G06F 15/16* | (2006.01) |
| *H04L 29/08* | (2006.01) |
| *H04N 21/414* | (2011.01) |
| *H04N 21/432* | (2011.01) |

(52) U.S. Cl.
CPC . *H04L 29/08522* (2013.01); *H04N 21/41407* (2013.01); *H04N 21/41415* (2013.01); *H04N 21/4325* (2013.01)

(58) Field of Classification Search
USPC ............... 709/231, 203, 204, 205, 217, 227
See application file for complete search history.

(56) References Cited

U.S. PATENT DOCUMENTS

| | | | |
|---|---|---|---|
| 4,218,705 | A | 8/1980 | Inaba et al. |
| 4,965,819 | A | 10/1990 | Kannes |
| 5,953,049 | A | 9/1999 | Horn et al. |
| 5,996,022 | A | 11/1999 | Krueger et al. |

(Continued)

FOREIGN PATENT DOCUMENTS

| | | |
|---|---|---|
| JP | 2003324779 A | 11/2003 |
| WO | 03044756 A1 | 5/2003 |
| WO | 2014058739 A1 | 4/2014 |

OTHER PUBLICATIONS

International Search Report and Written Opinion dated Jun. 14, 2013 for PCT Application No. PCT/US2013/028110.

(Continued)

*Primary Examiner* — Lan-Dai T Truong
(74) *Attorney, Agent, or Firm* — The Mueller Law Office, P.C.

(57) ABSTRACT

In an environment where video display devices are available for simultaneous viewing, servers provide audio streams to user devices for listening. People may, thus, listen to the audio streams through their user devices while watching the video display devices. An application on the user devices determines which audio streams are available, and the servers may indicate which audio streams are available. The application sends a request to a server to transmit a selected audio stream. The server transmits the selected audio stream, e.g. over a wireless network in the environment. A variety of additional features are enabled by the interaction of the application and the servers.

12 Claims, 20 Drawing Sheets

(56) References Cited

U.S. PATENT DOCUMENTS

| | | | |
|---|---|---|---|
| 6,160,570 A * | 12/2000 | Sitnik | H04N 7/163 |
| | | | 348/E7.061 |
| 6,871,356 B2 | 3/2005 | Chang | |
| 7,567,846 B2 | 7/2009 | Sztybel | |
| 7,636,930 B2 | 12/2009 | Chang | |
| 7,817,017 B1 | 10/2010 | Benun et al. | |
| 7,840,984 B1 | 11/2010 | Owens et al. | |
| 7,945,934 B2 | 5/2011 | Margis et al. | |
| 8,505,054 B1 | 8/2013 | Kirley | |
| 8,582,565 B1 | 11/2013 | Morsy et al. | |
| 8,688,086 B1 | 4/2014 | Cope et al. | |
| 8,767,714 B2 * | 7/2014 | Macha et al. | 370/352 |
| 8,768,714 B1 * | 7/2014 | Blesser | 704/500 |
| 2003/0159157 A1 | 8/2003 | Chan | |
| 2004/0080213 A1 | 4/2004 | Chang | |
| 2004/0083491 A1 | 4/2004 | Chang | |
| 2004/0220862 A1 | 11/2004 | Jackson | |
| 2004/0244035 A1 | 12/2004 | Wright et al. | |
| 2005/0066369 A1 | 3/2005 | Chang | |
| 2005/0160270 A1 * | 7/2005 | Goldberg et al. | 713/176 |
| 2006/0139490 A1 | 6/2006 | Fekkes et al. | |
| 2006/0156376 A1 | 7/2006 | Mukaide et al. | |
| 2006/0218595 A1 | 9/2006 | Chang | |
| 2008/0005770 A1 | 1/2008 | Acharya et al. | |
| 2009/0007193 A1 | 1/2009 | Correa et al. | |
| 2009/0037526 A1 | 2/2009 | Elliott et al. | |
| 2009/0083805 A1 | 3/2009 | Sizelove et al. | |
| 2009/0222729 A1 | 9/2009 | Deshpande | |
| 2009/0249393 A1 * | 10/2009 | Shelton et al. | 725/39 |
| 2009/0254623 A1 * | 10/2009 | Hones | H05B 37/029 |
| | | | 709/206 |
| 2009/0275306 A1 | 11/2009 | Kraft et al. | |
| 2009/0281903 A1 * | 11/2009 | Blatstein | G06Q 20/20 |
| | | | 705/15 |
| 2009/0310027 A1 | 12/2009 | Fleming | |
| 2009/0318077 A1 | 12/2009 | Ghahramani | |
| 2010/0007458 A1 | 1/2010 | Cannistraro et al. | |
| 2010/0010653 A1 | 1/2010 | Bear et al. | |
| 2010/0141833 A1 | 6/2010 | Lemmers | |
| 2010/0146445 A1 * | 6/2010 | Kraut | H04N 5/60 |
| | | | 715/821 |
| 2010/0146563 A1 | 6/2010 | Chang | |
| 2010/0180297 A1 | 7/2010 | Levine et al. | |
| 2010/0186051 A1 | 7/2010 | Vondoenhoff et al. | |
| 2011/0154386 A1 | 6/2011 | Cochinwala et al. | |
| 2011/0212770 A1 * | 9/2011 | Ocko et al. | 463/29 |
| 2011/0296484 A1 * | 12/2011 | Harres | H04H 20/57 |
| | | | 725/114 |
| 2012/0028566 A1 | 2/2012 | Vorbau et al. | |
| 2012/0033135 A1 * | 2/2012 | Spinelli | H04N 5/45 |
| | | | 348/565 |
| 2012/0042337 A1 | 2/2012 | De Bonet et al. | |
| 2012/0069131 A1 * | 3/2012 | Abelow | 348/14.01 |
| 2012/0095749 A1 | 4/2012 | Capretta | |
| 2012/0109743 A1 | 5/2012 | Balakrishnan et al. | |
| 2012/0169837 A1 | 7/2012 | Olofsson et al. | |
| 2012/0189140 A1 | 7/2012 | Hughes | |
| 2012/0200774 A1 | 8/2012 | Ehlers | |
| 2012/0203648 A1 | 8/2012 | Rothschild | |
| 2012/0236201 A1 * | 9/2012 | Larsen | H04N 21/235 |
| | | | 348/468 |
| 2012/0268553 A1 | 10/2012 | Talukder | |
| 2012/0281965 A1 | 11/2012 | Hunt et al. | |
| 2012/0301100 A1 | 11/2012 | Pereira | |
| 2013/0066844 A1 * | 3/2013 | Bowers | G06F 17/30038 |
| | | | 707/706 |
| 2013/0104248 A1 | 4/2013 | Dudek et al. | |
| 2013/0155318 A1 | 6/2013 | Boden et al. | |
| 2013/0211567 A1 | 8/2013 | Oganesyan et al. | |
| 2013/0222601 A1 * | 8/2013 | Engstrom et al. | 348/159 |
| 2014/0098715 A1 | 4/2014 | Morsy et al. | |
| 2014/0219469 A1 | 8/2014 | Geis et al. | |
| 2014/0376873 A1 | 12/2014 | Tanaka et al. | |
| 2014/0380382 A1 | 12/2014 | Gupta et al. | |
| 2015/0149146 A1 | 5/2015 | Abramovitz et al. | |
| 2015/0149301 A1 | 5/2015 | Dow et al. | |
| 2015/0208161 A1 | 7/2015 | Lesaffre | |

OTHER PUBLICATIONS

Wireless Entertainment Products, Broadcastvision Entertainment; Feb. 5, 2012, www.broadcastvision.com.

Purported Claim 1 Invalidity Chart for U.S. Pat. No. 8,495,236 dated Aug. 6, 2015, pp. 1-15.

Purported claim charts for U.S. Appl. No. 13/940,115 dated Aug. 26, 2015, pp. 1-21.

U.S. Appl. No. 61/493,194 filed on Jun. 10, 2012 and entitled "Systems and Methods for Providing Multiple Audio Streams in a Venue".

Office Action dated Feb. 26, 2016 for U.S. Appl. No. 14/538,743.
Office Action dated Mar. 11, 2016 for U.S. Appl. No. 14/749,412.
Office Action dated Aug. 28, 2015 for U.S. Appl. No. 14/538,743.
Office Action dated Oct. 28, 2015 for U.S. Appl. No. 14/749,412.

* cited by examiner

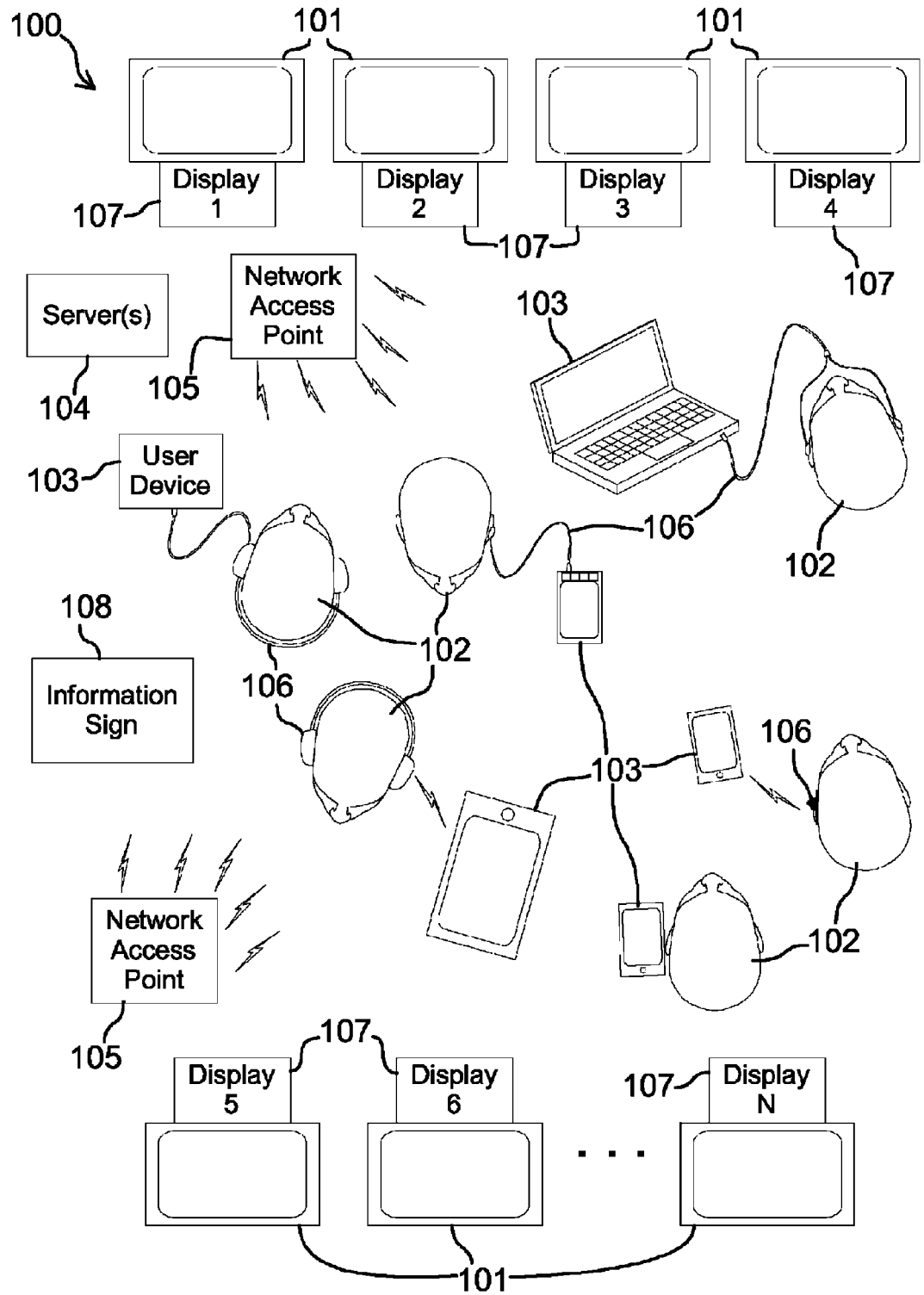

We have many video screens in this establishment. If you would like to listen to the audio corresponding to one of them on your smart phone or Wi-Fi connected device, please download and install the free App. Thank you. ⎬ 111

We presently support Apple (iPhone, iPad, iPod Touch), Android and Windows Phone. ⎬ 112

113 → www.appdownloadsite.com

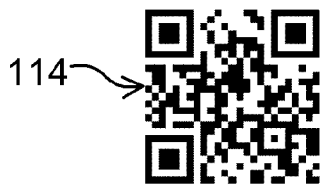
114

Order food and drink to your table using your smart phone and the ExXothermic App. ⎬ 115

116 ⎨ If you don't have the App, download it now

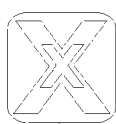
119

118
3 
Table 3

Wi-Fi SSID: ExXothermic@Joes
Wi-Fi Password: Eat ⎬ 117

INTERACTION OF USER DEVICES AND SERVERS IN AN ENVIRONMENT

CROSS-REFERENCE TO RELATED APPLICATIONS

This patent application is a continuation application and claims the benefit of U.S. patent application Ser. No. 13/556,461, filed on Jul. 24, 2012, which claimed the benefit of U.S. Provisional Patent No. 61/604,693 filed Feb. 29, 2012. The contents of U.S. Ser. No. 13/556,461 and of U.S. Provisional Patent No. 61/604,693 are incorporated herein by reference for all purposes.

BACKGROUND

A television generally provides both video and audio to viewers. In some situations, such as in a gym, restaurant/bar, airport waiting area, etc., multiple TVs or other video display devices (each with different video content) may be provided for public viewing to multiple clients/patrons in a single large room. If the audio signals of each TV were also provided for public listening in these situations, the noise level in the room would be intolerable and the people would not be able to distinguish the audio from any single TV nor the voices in their own personal conversations. Consequently, it is preferable to mute the audio signals on each of the TVs in these situations in order to prevent audio chaos. Some of the people, however, may be interested in hearing the audio in addition to seeing the video of some of the display devices in the room, and each such person may be interested in the program that's on a different one of the display devices.

One suggested solution is for the close captioning feature to be turned on for some or all of the display devices, so the people can read the text version of the audio for the program that interests them. However, the close captions are not always a sufficient solution for all of the people in the room.

Another suggested solution is for the audio streams to be provided through relatively short-distance or low-power radio broadcasts within the establishment wherein the display devices are viewable. Each display device is associated with a different radio frequency. Thus, the people can view a selected display device while listening to the corresponding audio stream by tuning their radios to the proper frequency. Each person uses headphones or earbuds or the like for private listening. For this solution to work, each person either brings their own radio or borrows/rents one from the establishment.

In another solution in an airplane environment, passengers are provided with video content on display devices while the associated audio is provided through a network. The network feeds the audio stream to an in-seat console such that when a user plugs a headset into the console, the audio stream is provided for the user's enjoyment.

SUMMARY

In an environment where video display devices are available for simultaneous viewing by multiple people, servers provide audio streams to user devices for individual private listening. People may, thus, listen to the audio streams through their user devices while watching the video display devices. An application on the user devices determines which audio streams are available, and the servers may indicate which audio streams are available. The application sends a request to a server to transmit a selected audio stream. The server transmits the selected audio stream, e.g. over a wireless network in the environment. A variety of additional features are enabled by the interaction of the application and the servers.

BRIEF DESCRIPTION OF THE DRAWINGS

FIG. 1 is a simplified schematic drawing of an environment incorporating audio-video (A/V) equipment in accordance with an embodiment of the present invention.

FIGS. 2 and 3 are simplified examples of signs or cards that may be used in the environment shown in FIG. 1 to provide information to users therein according to an embodiment of the present invention.

DETAILED DESCRIPTION

Figure 4:
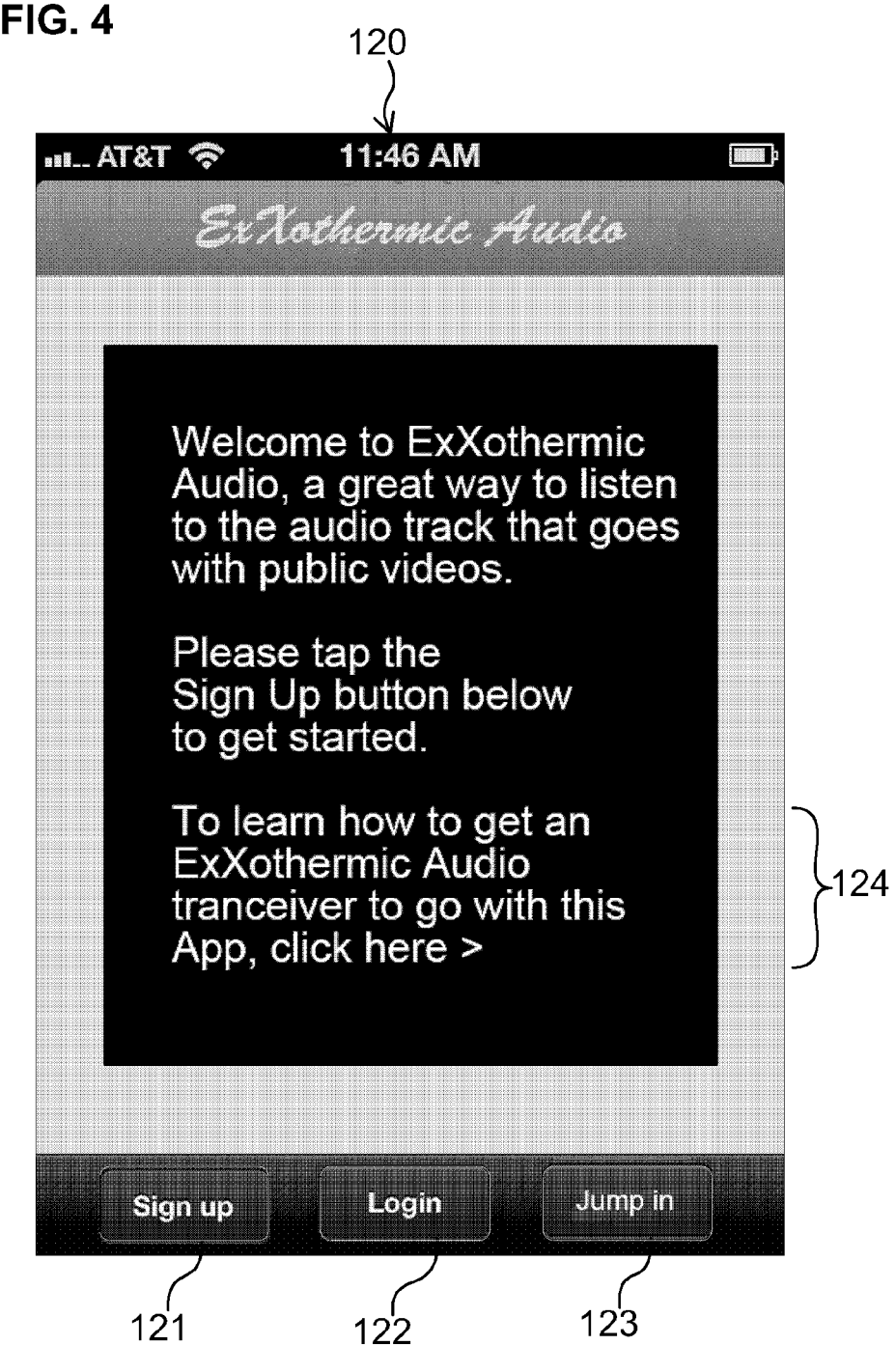
FIGS. 4-18 are simplified examples of views of a user interface for an application for use with the A/V equipment shown in FIG. 1 in accordance with an embodiment of the present invention.

In some embodiments, the solution described herein allows a user to utilize a personal portable device such as a smartphone to enjoy audio associated with a public display of video. The portable device utilizes a software application to provide the association of audio with the public video. Therefore, the present solution does not require very specific hardware within the seats or chairs or treadmills or nearby display devices, so it is readily adaptable for a restaurant/bar or other establishments.

An environment 100 incorporating a variety of audio-video (A/V) equipment in accordance with an embodiment of the present invention is shown in FIG. 1. In general, the environment 100 includes one or more video display devices 101 available for viewing by multiple people/users 102, at least some of whom have any one of a variety of user devices that have a display (the user devices) 103. Video streams (at least one per display device 101), such as television programs, Internet-based content, VCR/DVD/Blue-ray/DVR videos, etc., are generally provided through the display devices 101. The users 102 may thus watch as many of the video streams as are within viewing range or as are desired. Additionally, multiple audio streams corresponding to the video streams (generally at least one for each different video stream) are made available through a network (generally including one or more servers 104 and one or more network access points 105) accessible by the user devices 103. The users 102 who choose to do so, therefore, may select any available audio stream for listening with their user devices 103 while watching the corresponding video stream on the corresponding display device 101.

The environment 100 may be any place where video content may be viewed. For example, in some embodiments, the environment 100 may be a public establishment, such as a bar/pub, restaurant, airport lounge/waiting area, medical waiting area, exercise gym, outdoor venue, concert arena, drive-in movie theater or other establishment that provides at least one display device 101 for customer or public viewing. Users 102 with user devices 103 within the establishment may listen to the audio stream associated with the display device 101 of their choice without disturbing any other people in the same establishment. Additionally, picture-in-a-picture situations may have multiple video streams for only one display device 101, but if the audio streams are also available simultaneously, then different users 102 may listen to different audio streams. Furthermore, various features of the present invention may be used in a movie theater, a video conferencing setting, a distance video-learning environment, a home, an office or other place with at least one display device 101 where private listening is desired. In some embodiments, the environment 100 is an unstructured environment, as differentiated from rows of airplane seats or even rows of treadmills, where a user may listen only to the audio that corresponds to a single available display device.

According to some embodiments, the user devices 103 are multifunctional mobile devices, such as smart phones (e.g. iPhones™, Android™ phones, Windows Phones™, BlackBerry™ phones, Symbian™ phones, etc.), cordless phones, notebook computers, tablet computers, Maemo™ devices, MeeGo™ devices, personal digital assistants (PDAs), iPod Touches™, handheld game devices, audio/MP3 players, etc. Unlike for the prior art solution, described above, of using a radio to listen to the audio associated with display devices, it has become common practice in many places for people to carry one or more of the mobile devices mentioned, but not a radio. Additionally, whereas it may be inconvenient or troublesome to have to borrow or rent a radio from the establishment/environment 100, no such inconvenience occurs with respect to the mobile devices mentioned, since users 102 tend to always carry them anyway. Furthermore, cleanliness and health issues may arise from using borrowed or rented headphones, and cost and convenience issues may arise if the establishment/environment 100 has to provide new headphones or radio receivers for each customer, but no such problems arise when the users 102 all have their own user devices 103, through which they may listen to the audio. As such, the present invention is ideally suited for use with such mobile devices, since the users 102 need only download an application (or app) to run on their mobile device in order to access the benefits of the present invention when they enter the environment 100 and learn of the availability of the application. However, it is understood that the present invention is not necessarily limited only to use with mobile devices. Therefore, other embodiments may use devices that are typically not mobile for the user devices 103, such as desktop computers, game consoles, set top boxes, video recorders/players, land line phones, etc. In general, any computerized device capable of loading and/or running an application may potentially be used as the user devices 103.

In some embodiments, the users 102 listen to the selected audio stream via a set of headphones, earbuds, earplugs or other listening device 106. The listening device 106 may include a wired or wireless connection to the user device 103. Alternatively, if the user device 103 has a built-in speaker, then the user 102 may listen to the selected audio stream through the speaker, e.g. by holding the user device 103 next to the user's ear or placing the user device 103 near the user 102.

The display devices 101 may be televisions, computer monitors or other appropriate video or A/V display devices. In some embodiments, the audio stream received by the user devices 103 may take a path that completely bypasses the display devices 101, so it is not necessary for the display devices 101 to have audio capabilities. However, if the display device 101 can handle the audio stream, then some embodiments may pass the audio stream to the display device 101 in addition to the video stream, even if the audio stream is not presented through the display device 101, in order to preserve the option of sometimes turning on the audio of the display device 101. Additionally, if the display device 101 is so equipped, some embodiments may use the audio stream from a headphone jack or line out port of the display device 101 as the source for the audio stream that is transmitted to the user devices 103. Furthermore, in some embodiments, some or all of the functions described herein for the servers 104 and the network access points 105 may be built in to the display devices 101, so that the audio streams received by the user devices 103 may come directly from the display devices 101.

According to some embodiments, each user device 103 receives a selected one of the audio streams wirelessly. In these cases, therefore, the network access points 105 are wireless access points (WAPs) that transmit the audio streams wirelessly, such as with Wi-Fi, Bluetooth™, mobile phone, fixed wireless or other appropriate wireless technology. According to other embodiments, however, the network access points 105 use wired (rather than wireless) connections or a combination of both wired and wireless connections, so a physical cable may connect the network access points 105 to some or all of the user devices 103. The wired connections, however, may be less attractive for environments 100 in which flexibility and ease of use are generally desirable. For example, in a bar, restaurant, airport waiting area or the like, many of the customers (users 102) will likely already have a wireless multifunction mobile device (the user device 103) with them and will find it easy and convenient simply to access the audio streams wirelessly. In some embodiments, however, one or more users 102 may have a user device 103 placed in a preferred location for watching video content, e.g. next to a bed, sofa or chair in a home or office environment. In such cases, a wired connection between the user device 103 and the server 104 may be just as easy or convenient to establish as a wireless connection.

Each server 104 may be a specially designed electronic device having the functions described herein or a general purpose computer with appropriate peripheral devices and software for performing the functions described herein or other appropriate combination of hardware components and software. As a general purpose computer, the server 104 may include a motherboard with a microprocessor, a hard drive, memory (storing software and data) and other appropriate subcomponents and/or slots for attaching daughter cards for performing the functions described herein. Additionally, each server 104 may be a single unit device, or the functions thereof may be spread across multiple physical units with coordinated activities. In some embodiments, some or all of the functions of the servers 104 may be performed across the Internet or other network or within a cloud computing system.

Furthermore, according to different embodiments, the servers 104 may be located within the environment 100 (as shown in FIG. 1) or off premises (e.g. across the Internet or within a cloud computing system). If within the environment 100, then the servers 104 generally represent one or more hardware units (with or without software) that perform services with the A/V streams that are only within the environment 100. If off premises, however, then the servers 104 may represent a variety of different combinations and numbers of hardware units (with or without software) that may handle more than just the A/V streams that go to only one environment 100. In such embodiments, the servers 104 may service any number of one or more environments 100, each with its own appropriate configuration of display devices 101 and network access points 105. Location information from/about the environments 100 may aid in assuring that the appropriate audio content is available to each environment 100, including the correct over-the-air TV broadcasts.

The number of servers 104 that service any given environment 100 (either within the environment 100 or off premises) is generally dependent on a variety of factors including, but not limited to, the number of display devices 101 within the environment 100, the number of audio or A/V streams each server 104 is capable of handling, the number of network access points 105 and user devices 103 each server 104 is capable of servicing and the number of users 102 that can fit in the environment 100. Additionally, the number of network access points 105 within any given environment 100 is generally dependent on a variety of factors including, but not limited to, the number of display devices 101 within the environment 100, the size of the environment 100, the number of users 102 that can fit in the environment 100, the range of each network access point 105, the bandwidth and/or transmission speed of each network access point 105, the degree of audio compression and the presence of any RF obstructions (e.g. walls separating different rooms within the environment 100). In some embodiments, there may even be at least one server 104 and at least one network access point 105 connected at each display device 101.

Each server 104 generally receives one or more audio streams (and optionally the corresponding one or more video streams) from an audio or A/V source (described below). The servers 104 also generally receive (among other potential communications) requests from the user devices 103 to access the audio streams. Therefore, each server 104 also generally processes (including encoding and packetizing) each of its requested audio streams for transmission through the network access points 105 to the user devices 103 that made the access requests. In some embodiments, each server 104 does not process any of its audio streams that have not been requested by any user device 103. Additional functions and configurations of the servers 104 are described below with respect to FIGS. 19-21.

In some embodiments, each of the display devices 101 has a number, letter, symbol, code, thumbnail or other display indicator 107 associated with it. For example, the display indicator 107 for each display device 101 may be a sign mounted on or near the display device 101. The display indicator 107 generally uniquely identifies the associated display device 101. Additionally, either the servers 104 or the network access points 105 (or both) provide to the user devices 103 identifying information for each available audio stream in a manner that corresponds to the display indicators 107, as described below. Therefore, each user 102 is able to select through the user device 103 the audio stream that corresponds to the desired display device 101.

Particularly for, but not necessarily limited to, embodiments in which the environment 100 is a public venue or establishment (e.g. bar, pub, restaurant, airport lounge area, museum, medical waiting room, etc.), an information sign 108 may be provided within the environment 100 to present information to the users 102 regarding how to access the audio streams for the display devices 101 and any other features available through the application that they can run on their user devices 103. The information sign 108 may be prominently displayed within the environment 100. Alternatively, an information card with similar information may be placed on each of the tables within the environment 100, e.g. for embodiments involving a bar or restaurant.

Two examples of an information sign (or card) that may be used for the information sign 108 are shown in FIGS. 2 and 3. The words shown on the example information sign/card 109 in FIG. 2 and the example information sign/card 110 in FIG. 3 are given for illustrative purposes only, so it is understood that embodiments of the present invention are not limited to the wordings shown. Any appropriate wording that provides any desired initial information is acceptable. Such information may include, but not be limited to, the availability of any of the functions described herein.

For the example information sign/card 109 in FIG. 2, a first section 111 generally informs the users 102 that they can listen to the audio for any of the display devices 101 by downloading an application to their smart phone or Wi-Fi enabled user device 103. A second example section 112 generally informs the users 102 of the operating systems or platforms or types of user devices 103 that the can use the application, e.g. Apple™ devices (iPhone™, iPad™ and iPod Touch™), Google Android™ devices or Windows Phone™ devices. (Other types of user devices may also be supported in other embodiments.) A third example section 113 generally provides a URL (uniform resource locator) that the users 102 may enter into their user devices 103 to download the application (or access a website where the application may be found) through a cell phone network or a network/wireless access point, depending on the capabilities of the user devices 103. The network access points 105 and servers 104, for example, may serve as a Wi-Fi hotspot through which the user devices 103 can download the application. A fourth example section 114 in the example information sign/card 109 generally provides a QR (Quick Response) Code™ (a type of matrix barcode or two-dimensional code for use with devices that have cameras, such as some types of the user devices 103) that can be used for URL redirection to acquire the application or access the website for the application.

The example information sign/card 110 in FIG. 3 generally informs the users 102 of the application and provides information for additional features available through the application besides audio listening. Such features may be a natural addition to the audio listening application, since once the users 102 have accessed the servers 104, this connection becomes a convenient means through which the users 102 could further interact with the environment 100. For example, in an embodiment in which the environment 100 is a bar or restaurant, a first section 115 of the example information sign/card 110 generally informs the users 102 that they can order food and drink through an application on their user device 103 without having to get the attention of a wait staff person. A second section 116 generally informs the users 102 how to acquire the application for their user devices 103. In the illustrated case, another QR Code is provided for this purpose, but other means for accessing a website or the application may also be provided.

A third section 117 generally provides a Wi-Fi SSID (Service Set Identifier) and password for the user 102 to use with the user device 103 to login to the server 104 through the network access point 105. The login may be done in order to download the application or after downloading the application to access the available services through the application. The application, for example, may recognize a special string of letters and/or numbers within the SSID to identify the network access point 105 as being a gateway to the relevant servers 104 and the desired services. (The SSIDs of the network access points 105 may, thus, be factory set in order to ensure proper interoperability with the applications on the user devices 103. Otherwise, instructions for an operator to set up the servers 104 and the network access points 105 in an environment 100 may instruct the operator to use a predetermined character string for at least part of the SSIDs.) In some embodiments, the application may be designed to ignore Wi-Fi hotspots that use SSIDs that do not have the special string of letters and/or numbers. In the illustrated case, an example trade name "ExXothermic" (used here and in other Figs.) is used as the special string of letters within the SSID to inform the application (or the user 102) that the network access point 105 with that SSID will lead to the appropriate server 104 and at least some of the desired services. In other embodiments, the SSIDs do not have any special string of letters or numbers, so the applications on the user devices 103 may have to query every accessible network access point 105 or hot spot to determine whether a server 104 is available. The remaining string "@Joes" is an example of additional optional characters in the SSID that may specifically identify the corresponding network access point 105 as being within a particular example environment 100 having an example name "Joe's".

In an embodiment in which the example information sign/card 110 is associated with a particular table within the environment 100, a fourth section 118 generally identifies the table, e.g. with a letter, symbol or number (in this example, the number 3). An additional QR Code is also provided, so that properly equipped user devices 103 can scan the QR Code to identify the table. In this manner, the food and/or beverage order placed by the user 102 can be associated with the proper table for delivery by a wait staff person.

In addition to the example trade name "ExXothermic", the example information sign/card 110 shows an example logo 119. With such pieces of information, the users 102 who have previously tried out the application on their user devices 103 at any participating environment 100 can quickly identify the current environment 100 as one in which they can use the same application.

In some embodiment, the servers 104 work only with "approved" applications. Such approval requirements may be implemented in a similar manner to that of set-top-boxes which are authorized to decode only certain cable or satellite channels. For instance, the servers 104 may encrypt the audio streams in a way that can be decrypted only by particular keys that are distributed only to the approved applications. These keys may be updated when new versions or upgrades of the application are downloaded and installed on the user devices 103. Alternatively, the application could use other keys to request the servers 104 to send the keys for decrypting the audio streams.

Similarly, in some embodiments, the applications may work only with "approved" servers 104. For example, the application may enable audio streaming only after ascertaining, through an exchange of keys, that the transmitting server 104 is approved.

The downloading of the application to the user devices 103 is generally performed according to the conventional functions of the user devices 103 and does not need to be described here. Once downloaded, the exact series of information or screens presented to the users 102 through the user devices 103 may depend on the design choices of the makers of the application. For an embodiment using a smart phone or other multifunctional mobile device for the user device 103, an example series of views or simulated screenshots of screens of a user interface for the application is provided in FIGS. 4-18. It is understood, however, that the present invention is not necessarily limited to these particular examples. Instead, these examples are provided for illustrative purposes only, and other embodiments may present any other appropriate information, options or screen views, including, but not limited to, any that may be associated with any of the functions described herein. Additionally, any of the features shown for any of the screens in FIGS. 4-18 may be optional where appropriate.

In the illustrated example, an initial welcome screen 120, as shown in FIG. 4, is presented on a display of the user devices 103 to the users 102 upon launching the application on their user devices 103. Additionally, an option is provided to the users 102 to "sign up" (e.g. a touch screen button 121) for the services provided by the application, so the servers 104 can potentially keep track of the activities and preferences of the users 102. If already signed up, the users 102 may "login" (e.g. a touch screen button 122) to the services. Alternatively, the users 102 may simply "jump in" (e.g. a touch screen button 123) to the services anonymously for those users 102 who prefer not to be tracked by the servers 104. Furthermore, an example touch screen section 124 may lead the users 102 to further information on how to acquire such services for their own environments 100. Other embodiments may present other information or options in an initial welcome screen.

Figure 5:
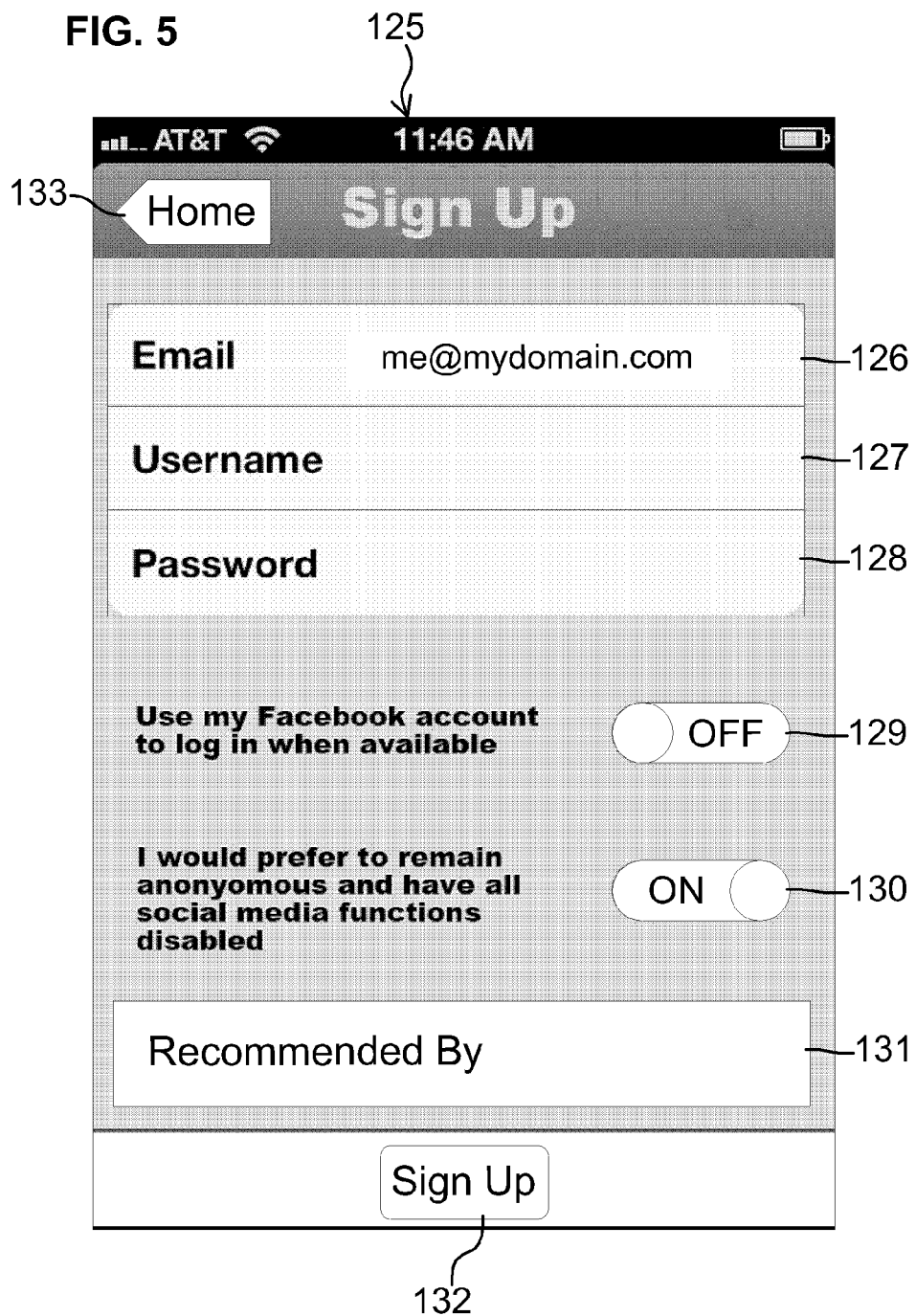

In this example, if the user 102 chooses to "sign up" (button 121, FIG. 4), then the user 102 is directed to a sign up screen 125, as shown in FIG. 5. The user 102 may then enter pertinent information, such as an email address, a username and a password in appropriate entry boxes, e.g. 126, 127 and 128, respectively. The user 102 may also be allowed to link (e.g. at 129) this sign up with an available social networking service, such as Internet-based social networking features of Facebook (as shown), Twitter, Google+ or the like (e.g. for ease of logging in or to allow the application or server 104 to post messages on the user's behalf within the social networking site). Additionally, the user 102 may be allowed to choose (e.g. at 130) to remain anonymous (e.g. to prevent being tracked by the server 104) or to disable social media/networking functions (e.g. to prevent the application or server 104 from posting messages on the user's behalf to any social networking sites). However, by logging in (not anonymously) when they enter an environment 100, the users 102 may garner "loyalty points" for the time and money they spend within the environments 100. The application and/or the servers 104 may track such time and/or money for each user 102 who does not login anonymously. Thus, the users 102 may be rewarded with specials, discounts and/or free items by the owner of the environment 100 or by the operator of the servers 104 when they garner a certain number of "loyalty points."

Furthermore, an optional entry box 131 may be provided for a new user 102 to enter identifying information of a preexisting user 102 who has recommended the application or the environment 100 to the new user 102. In this manner, the new user 102 may be linked to the preexisting user 102, so that the server 104 or the owners of the environment 100 may provide bonuses to the preexisting user 102 for having brought in the new user 102. The users 102 may also garner additional "loyalty points" for bringing in new users 102 or simply new customers to the environment 100. The users 102 may gain further loyalty points when the new users 102 return to the environment 100 in the future.

After entering all of the pertinent information and selecting the various options, the user 102 may press a touch screen button 132 to complete the sign up. Alternatively, the user 102 may prefer to return to the initial welcome screen 120 by pressing another touch screen button 133 (e.g. "Home"). Other embodiments may offer other sign up procedures or selections.

Figure 6:
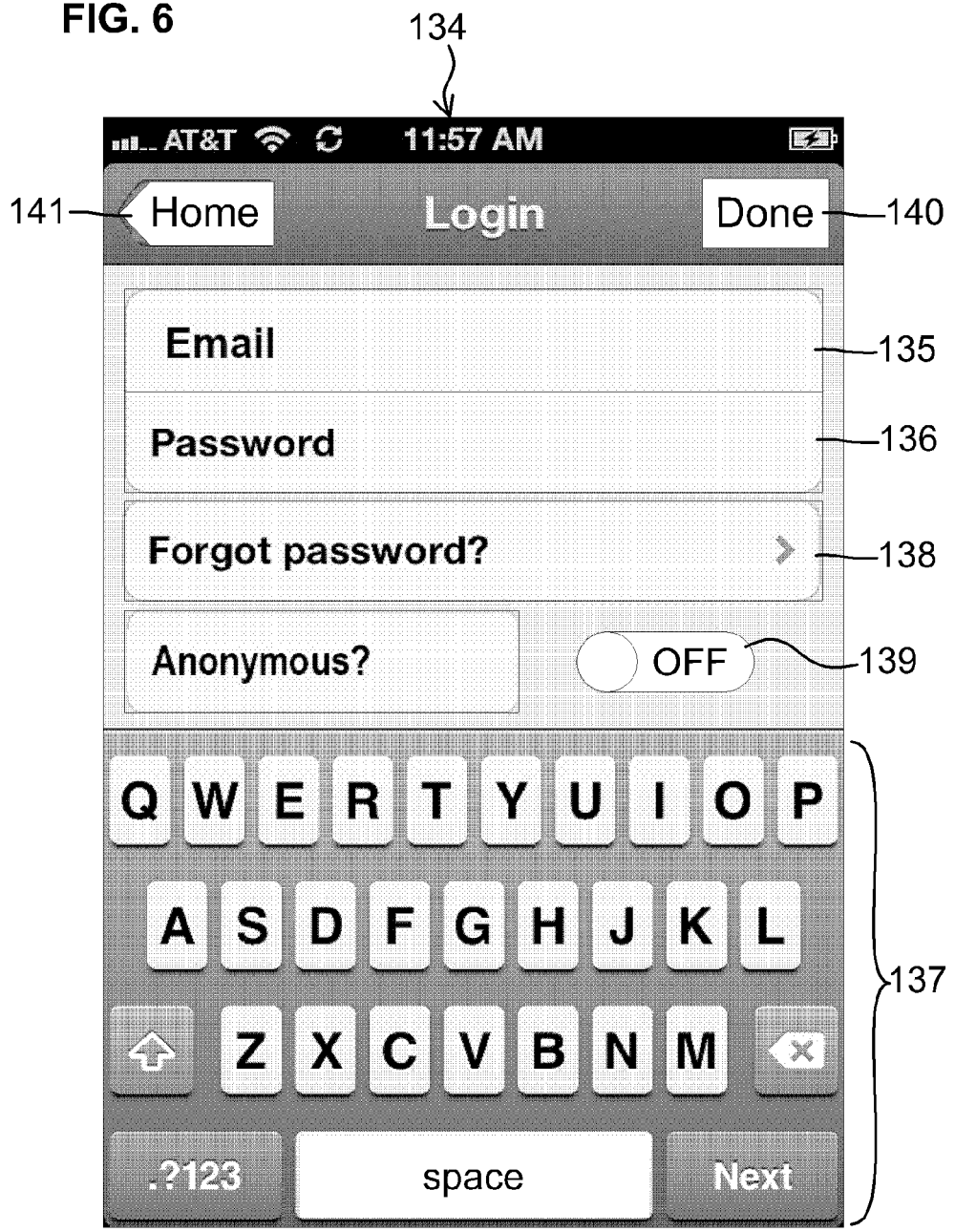

In this example, if the user 102 chooses to "login" (button 122, FIG. 4), then the user 102 is directed to a login screen 134, as shown in FIG. 6. The user 102 thus enters an email address (e.g. at 135) and password (e.g. at 136) using a touch screen keyboard (e.g. at 137). There is also an option (e.g. at 138) for the user 102 to select when the user 102 has forgotten the password. Furthermore, there is another option for the user 102 to set (e.g. at 139) to always login anonymously or not. There is a touch screen button "Done" 140 for when the user 102 has finished entering information or making selections. Additionally, there is a touch screen button "Home" 141 for the user 102 to return to the initial welcome screen 120 if desired. Other embodiments may offer other login procedures or selections.

Figure 7:
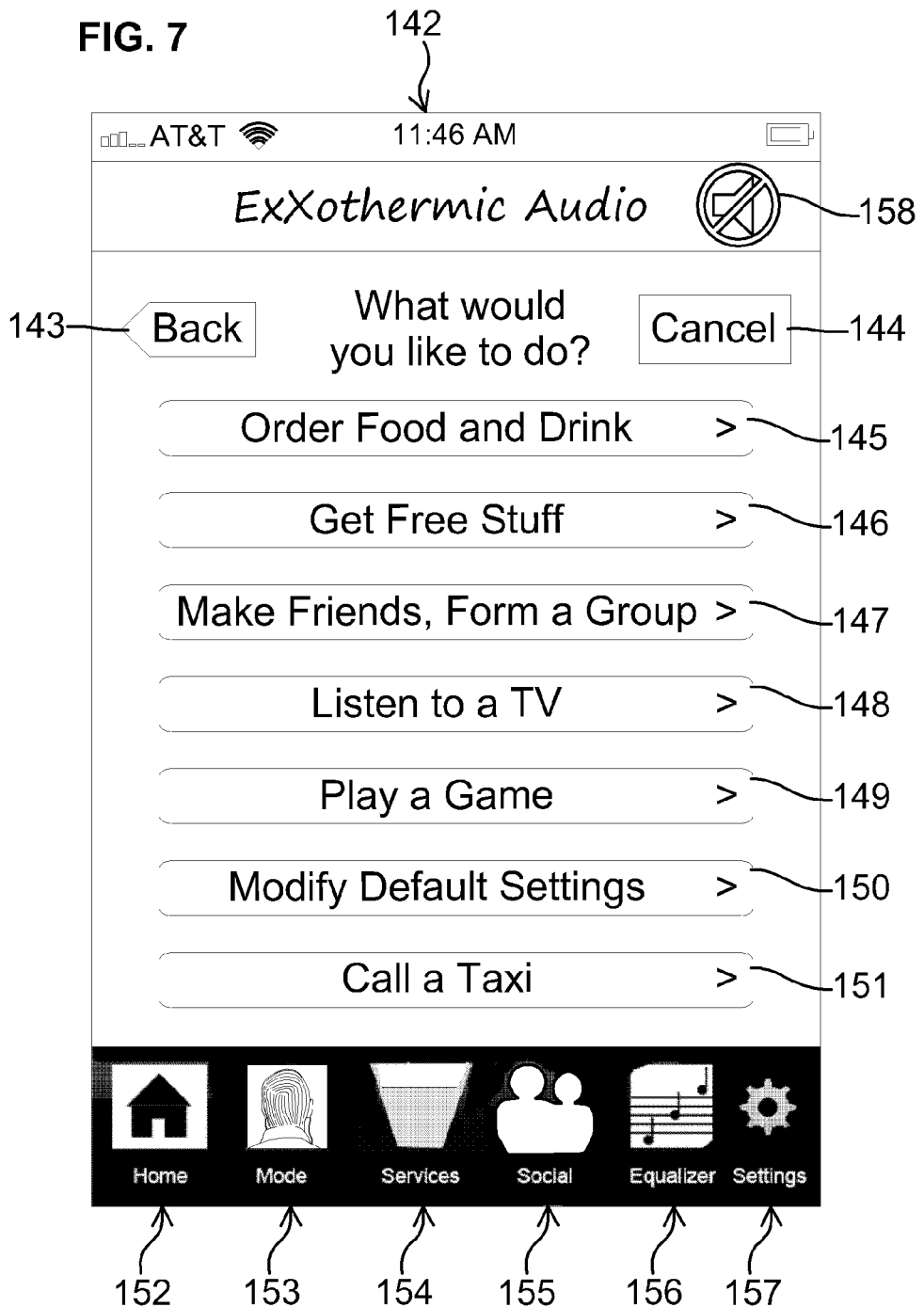

In this example, after the user 102 has signed up or logged in, the user device 103 presents a general action selection screen 142, as shown in FIG. 7, wherein the user 102 is prompted for an action by asking "What would you like to do?" "Back" (at 143) and "Cancel" (at 144) touch screen buttons are provided for the user 102 to return to an earlier screen, cancel a command or exit the application if desired. An option to order food and drinks (e.g. touch screen button 145) may lead the user 102 to another screen for that purpose, as described below with respect to FIGS. 14-18. An option (e.g. touch screen button 146) may be provided for the user 102 to try to obtain free promotional items being given away by an owner of the environment 100. Touching this button 146, thus, may present the user 102 with another screen (not shown) for such opportunities.

An option (e.g. touch screen button 147) to make friends, meet other people and/or potentially join or form a group of people within the environment 100 may lead the user 102 to yet another screen (not shown). Since it is fairly well established that customers of a bar or pub, for example, will have more fun if they are interacting with other customers in the establishment, thereby staying to buy more products from the establishment, this option may lead to any number or combinations of opportunities for social interaction by the users 102. Any type of environment 100 may, thus, reward the formation of groups of the users 102 by providing free snacks, munchies, hors d'oeuvres, appetizers, drinks, paraphernalia, goods, services, coupons, etc. to members of the group. The users 102 also may come together into groups for reasons other than to receive free stuff, such as to play a game or engage in competitions or just to socialize and get to know each other. The application on the user devices 103, thus, may facilitate the games, competitions and socializing by providing a user interface for performing these tasks. Various embodiments, therefore, may provide a variety of different screens (not shown) for establishing and participating in groups or meeting other people or playing games within the environment 100. Additionally, such activities may be linked to the users' social networks to enable further opportunities for social interaction. In an embodiment in which the environment 100 is a workout gym, for example, a user 102 may use the form-a-group button 147 to expedite finding a workout partner, e.g. someone who generally shows up around the same time as the user 102. A user 102 could provide a relationship status to other users 102 within the gym, e.g. "always works alone", "looking for a partner", "need a carpool", etc.

The formation of the groups may be done in many different ways. For example, the application may lead some users 102 to other users 102, or some users 102 may approach other customers (whether they are other users 102 or not) within the environment 100, or some users 102 may bring other people into the environment, etc. To establish multiple users 102 as a group, the users 102 may exchange some identifying information that they enter into the application on their user devices 103, thereby linking their user devices 103 into a group. In order to prevent unwanted exchange of private information, for example, the server 104 or the application on the user devices 103 may randomly generate a code that one user 102 may give to another user 102 to form a group. Alternatively, the application of one user device 103 may present a screen with another QR Code of which another user device 103 (if so equipped) may take a picture in order to have the application of the other user device 103 automatically link the user devices 103 into a group. Other embodiments may use other appropriate ways to form groups or allow users 102 to meet each other within environments 100.

An option to listen to one of the display devices 101 (e.g. "listen to a TV" touch screen button 148) may lead the user 102 to another screen, such as is described below with reference to FIG. 8. Another option (e.g. touch screen button 149) to play a game (e.g. a trivia game, and with or without a group) may lead the user 102 to one or more additional screens (not shown). Another option (e.g. touch screen button 150) to modify certain settings for the application may lead the user 102 to one or more other screens, such as those described below with reference to FIGS. 11-13. Furthermore, another option (e.g. touch screen button 151) to call a taxi may automatically place a call to a taxi service or may lead the user 102 to another screen (not shown) with further options to select one of multiple known taxi services that operate near the environment 100.

Other embodiments may include other options for general functions not shown in FIG. 7. For example, for an embodiment in which the environment 100 is an exercise gym or facility, the application may provide an option for the user 102 to keep track of exercises and workouts and time spent in the gym. In another example, for an embodiment in which the environment 100 is a bar, the application may provide an option for the user 102 to keep track of the amount of alcohol the user 102 has consumed over a period of time. The alcohol consumption data may also be provided to the server 104 in order to alert a manager or wait staff person within the environment 100 that a particular user 102 may need a free coffee or taxi ride.

In addition to the other options described herein, a set of icon control buttons 152-157 that may be used on multiple screens are shown at the bottom of the general action selection screen 142. For example, a home icon 152 may be pressed to take the user 102 back to an initial home screen, such as the initial welcome screen 120 or the general action selection screen 142. A mode icon 153 may be pressed to take the user 102 to a mode selection screen, such as that described below with respect to FIG. 11. A services icon 154, similar to the function of the "order food and drinks" touch screen button 145 described above, may be pressed to take the user 102 to a food and drink selection screen, as described below with respect to FIGS. 14-18. A social icon 155, similar to the "make friends or form a group" touch screen button 147 described above, may be pressed for a similar function. An equalizer icon 156 may be pressed to take the user 102 to an equalizer selection screen, such as that described below with respect to FIG. 12. A settings icon 157 may be pressed to take the user 102 to a settings selection screen, such as that described below with respect to FIG. 13. Other embodiments may use different types or numbers (including zero) of icons for different purposes.

Furthermore, the general action selection screen 142 has a mute icon 158. If the application is playing an audio stream associated with one of the display devices 101 (FIG. 1) while the user 102 is viewing this screen 142, the user 102 has the option of muting (and un-muting) the audio stream by pressing the mute icon 158. In some embodiments in which the user device 103 is a smart phone, the mute function may be automatic when a call comes in. On the other hand, in an embodiment in which the environment 100 is a movie theater and the user device 103 is a smart phone, the application on the user device 103 may automatically silence the ringer of the user device 103.

Figure 8:
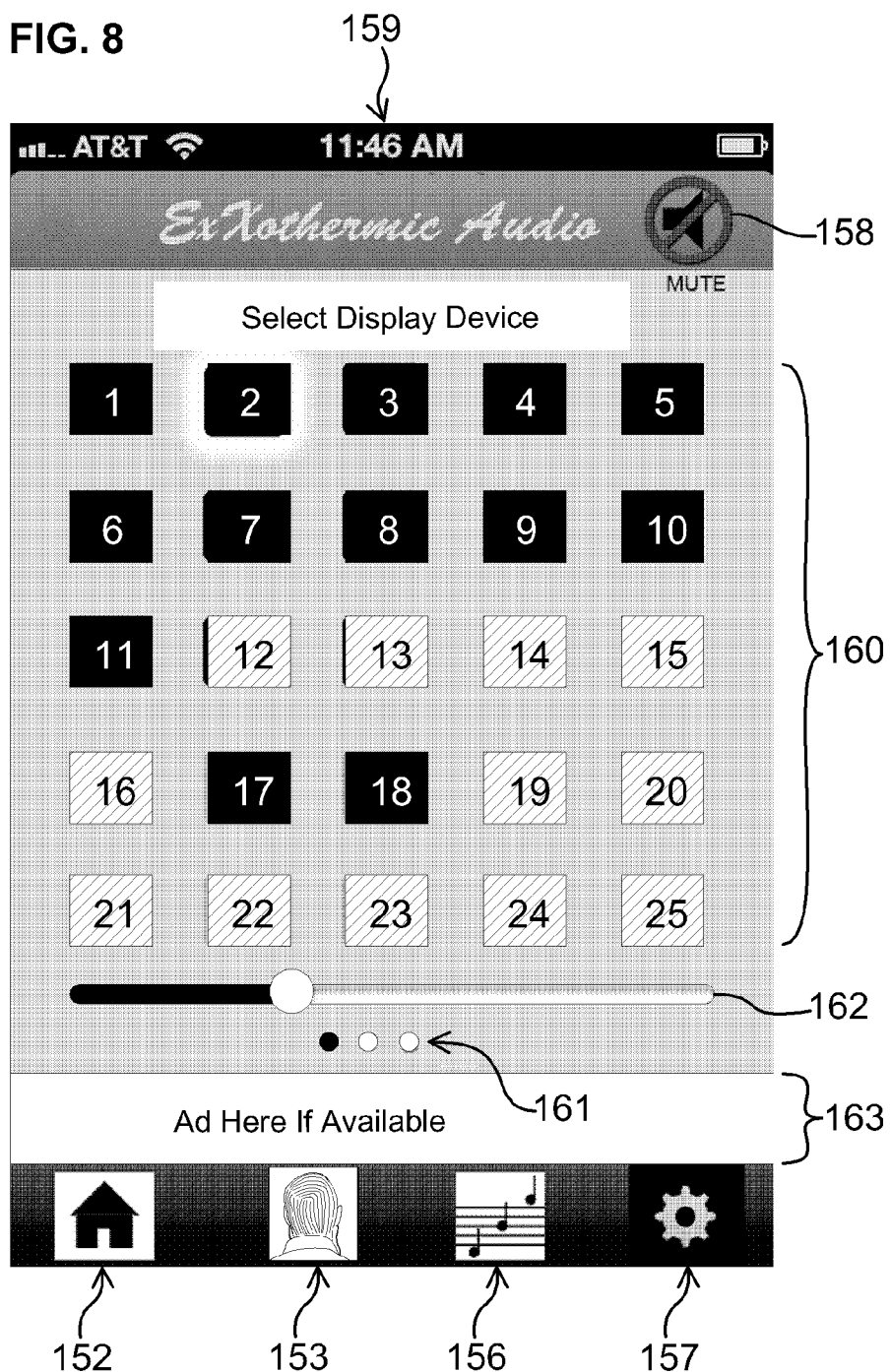

In this example, after the user 102 has signed up, logged in or made an appropriate selection (such as pressing the "listen to a TV" touch screen button 148, mentioned above), the application on the user device 103 presents a display device selection screen 159, as shown in FIG. 8. This selection screen 159 prompts the user 102 to select one of the display devices 101 for listening to the associated audio stream. Thus, the display device selection screen 159 presents a set or table of display identifiers 160.

The display identifiers 160 generally correspond to the numbers, letters, symbols, codes, thumbnails or other display indicators 107 associated with the display devices 101, as described above. In the illustrated example, the numbers 1-25 are displayed. The numbers 1-11, 17 and 18 are shown as white numbers on a black background to indicate that the audio streams for the corresponding display devices 101 are available to the user device 103. The numbers 12-16 and 19-25 are shown as black numbers on a cross-hatched background to indicate that either there are no display devices 101 that correspond to these numbers within the environment 100 or the network access points 105 that service these display devices 101 are out of range of the user device 103. The user 102 may select any of the available audio streams by pressing on the corresponding number. The application then connects to the network access point 105 that services or hosts the selected audio stream. The number "2" is highlighted to indicate that the user device 103 is currently accessing the display device 101 that corresponds to the display indicator 107 number "2".

In some embodiments, the servers 104 may provide audio streams not associated with any of the display devices 101. Examples may include Pandora™ or Sirius™ radio. Therefore, additional audio identifiers or descriptors (not shown) may be presented alongside the display identifiers 160.

The application on the user device 103 may receive or gather data that indicates which display identifiers 160 should be presented as being available in a variety of different ways. For example, the SSIDs for the network access points 105 may indicate which display devices 101 each network access point 105 services. In some embodiments, if the network access points 105 each service only one display device 101, then the display indicator 107 (e.g. a number or letter) may be part of the SSID and may follow immediately after a specific string of characters. For example, if the application on the user device 103 receives an SSID of "ExX12" from a network access point 105, the application may interpret the string "ExX" as indicating that the network access point 105 is connected to at least one of the desired servers 104 and that the audio stream corresponding to the display device 101 having the display indicator 107 of number "12" is available. In other embodiments, if the network access points 105 service more than one display device 101, but each display indicator 107 is guaranteed to be only a single character, then an SSID of "ExX034a" may indicate that the network access point 105 services the display devices 101 that have the display indicators 107 of numbers "0", "3" and "4" and letter "a". In another embodiment, if the network access points 105 service more than one display device 101, and each display indicator 107 is guaranteed to be no bigger than three characters, then an SSID of "ExX005007023" may indicate that the network access point 105 services the display devices 101 that have the display indicators 107 of numbers "5", "7" and "23". In another embodiment, an SSID of "ExX#[5:8]" may indicate that the network access point 105 services the display devices 101 that have the display indicators 107 of numbers "5", "6", "7" and "8".

In some embodiments, however, the SSIDs do not indicate which display devices 101 each network access point 105 services. In such cases, the application on the user devices 103 may have to login to each accessible network access point 105 and query each connected server 104 for a list of the available display indicators 107. Each of the network access points 105 may potentially have the same recognizable SSID in this case. Other embodiments may user other techniques or any combination of these and other techniques for the applications on the user devices 103 to determine which display identifiers 160 are to be presented as available. If the operating system of the user device 103 does not allow applications to automatically select an SSID to connect to a network access point 105, then the application may have to present available SSIDs to the user 102 for the user 102 to make the selection.

A set of page indicator circles 161 are also provided. The number of page indicator circles 161 corresponds to the number of pages of display identifiers 160 that are available. In the illustrated example, three page indicator circles 161 are shown to indicate that there are three pages of display identifiers 160 available. The first (left-most) page indicator circle 161 is fully blackened to indicate that the current page of display identifiers 160 is the first such page. The user 102 may switch to the other pages by swiping the screen left or right as if leafing through pages of a book. Other embodiments may use other methods of presenting multiple display identifiers 160 or multiple pages of such display identifiers 160.

Additionally, other embodiments may allow other methods of selecting an audio stream. For example, If the user device 103 contains a camera, the channel selection can be done by a bar code or QR Code on the information sign 108 (FIG. 1) or with the appropriate pattern recognition software by pointing the camera at the desired display device 101 or at a thumbnail of the show that is playing on the display devices 101. There may also be other designators which may include electromagnetic signatures.

Alternatively, the application may switch to a different audio stream based on whether the user points the camera of the user device 103 at a particular display device 101. Also, low-resolution versions of the available video streams could be transmitted to the user device 103, so the application can correlate the images streamed to the user device 193 and the image seen by the camera of the user device 103 to choose the best display device 101 match. Alternatively, the image taken by the camera of the user device 103 may be transmitted to the server 104 for the server 104 to make the match.

In other embodiments, a motion/direction sensor, e.g. connected to the user's listening device, may determine which direction the user 102 is looking, so that when the user 102 looks in the direction of a particular display device 101, the user 102 hears the audio stream for that display device 101. Additionally or in the alternative, when the user 102 looks at a person, a microphone turns on, so the user may hear that person. A locking option may allow the user 102 to prevent the application from changing the audio stream every time the user 102 looks in a different direction. In some embodiments, the user 102 may toggle a touch screen button when looking at a particular display device 101 in order to lock onto that display device 101. In some embodiments, the application may respond to keying sequences so that the user 102 can quickly select a mode in which the user device 103 relays an audio stream. For example, a single click of a key may cause the user device 103 to pause the sound. Two clicks may be used to change to a different display device 101. The user 102 may, in some embodiments, hold down a key on the user device 103 to be able to scan various audio streams, for example, as the user 102 looks in different directions, or as in a manner similar to the scan function of a car radio.

In this example, a volume slider bar 162 is provided to enable the user 102 to control the volume of the audio stream. Alternatively, the user 102 could adjust the volume using a volume control means built in to the user device 103. Additionally, the mute icon 158 is provided in this screen 159 to allow the user 102 to mute and un-mute the audio stream.

In this example, some of the icon control buttons 152-157 shown in FIG. 7 and described above are also shown in FIG. 8. For the screen 159, however, only the icon buttons 152, 153, 156 and 157 are shown to illustrate the option of using only those icon control buttons that may be relevant to a particular screen, rather than always using all of the same icon control buttons for every screen.

Furthermore, the screen 159 includes an ad section 163. A banner ad or scrolling ad or other visual message may be placed here if available. For example, the owner of the environment 100 or the operator of the servers 104 or other contractors may insert such ads or messages into this screen 159 and any other appropriate screens that may be used. Additionally, such visual ads or messages or coupons may be provided to the users 102 via pop-up windows or full screens.

Figure 9:
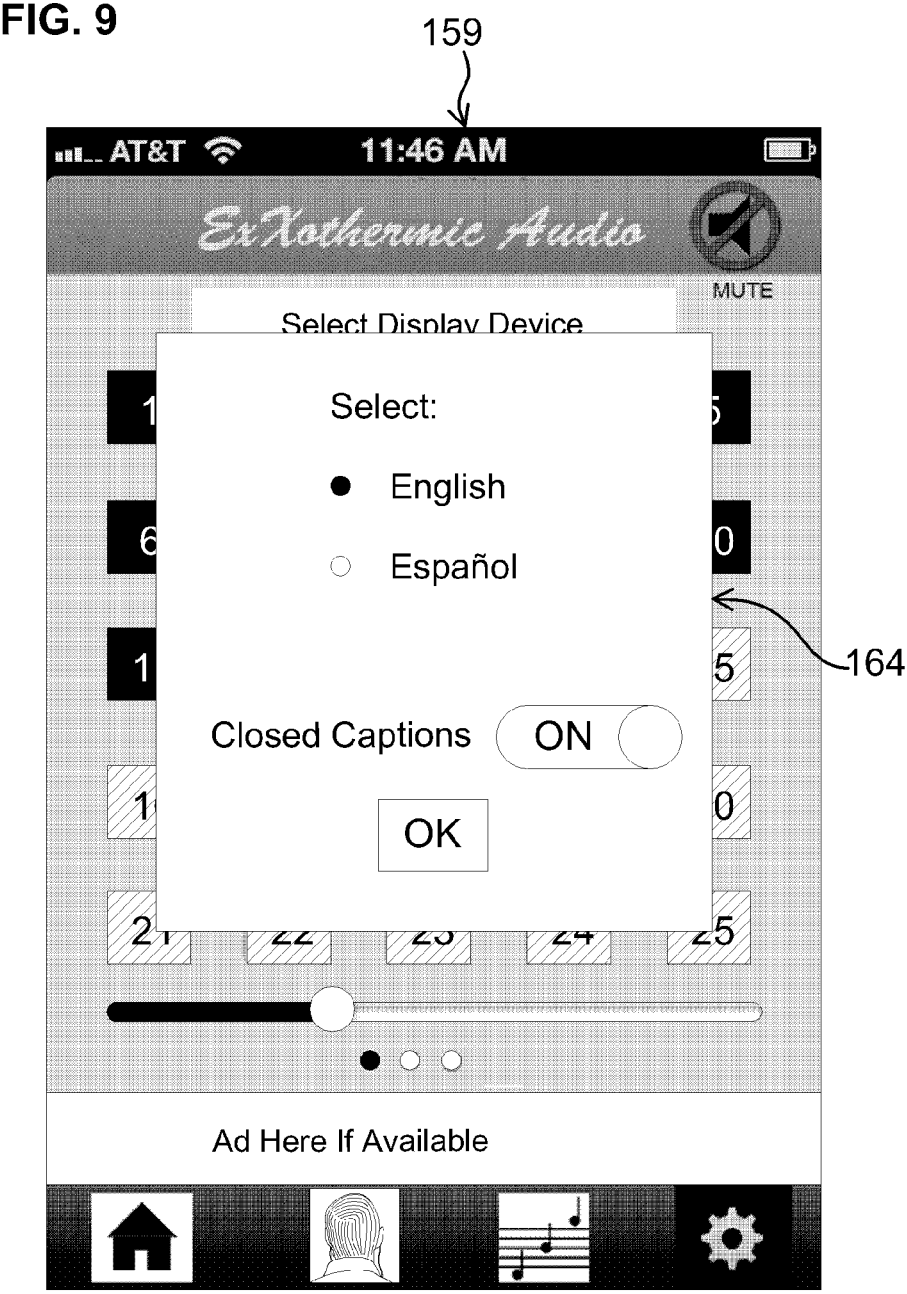

In this example, upon selecting one of the display identifiers 160 in the display device selection screen 159, an additional selection screen may be presented, such as a pop-up window 164 that may appear over the screen 159, as shown in FIG. 9. Some of the video streams that may be provided to the display devices 101, for example, may have more than one audio stream available, i.e. may support an SAP (Second Audio Program). The pop-up window 164, therefore, illustrates an example in which the user 102 may select an English or Spanish (Español) audio stream for the corresponding video stream. Additionally, closed captioning or subtitles may be available for the video stream, so the user 102 may turn on this option in addition to or instead of the selected audio stream. The user 102 may then read the closed captions more easily with the user device 103 than on the display device 102, since the user 102 may have the option of making the text as large as necessary to read comfortably. Additionally, in some embodiments, the servers 104 or applications on the user devices 103 may provide real time language translation to the user 102, which may be an option that the user 102 may select on the pop-up window 164. This feature could be stand-alone or connected via the Internet to cloud services such as Google Translate™.

After selecting a desired audio stream and/or closed captioning as in FIGS. 8 and/or 9, the application may present any appropriate screen while the user 102 listens to the audio stream (or reads the closed captions). For example, the application may continue to present the display device selection screen 159 of FIG. 8 or return to the general action selection screen 142 of FIG. 7 or simply blank-out the screen during this time. For closed captions, a special closed captioning screen (not shown) may be presented. For embodiments in which the environment 100 is a home or movie theater, for example, it may be preferable to ensure that the screen of the user device 103 does not put out too much light that might annoy other people in the home or movie theater. The special closed captioning screen, for example, may use light colored or red letters on a dark background, to minimize the output of light. In some embodiments, the screen on the user device 103 could show any data feed that the user 102 desires, such as a stock ticker.

Figure 10:
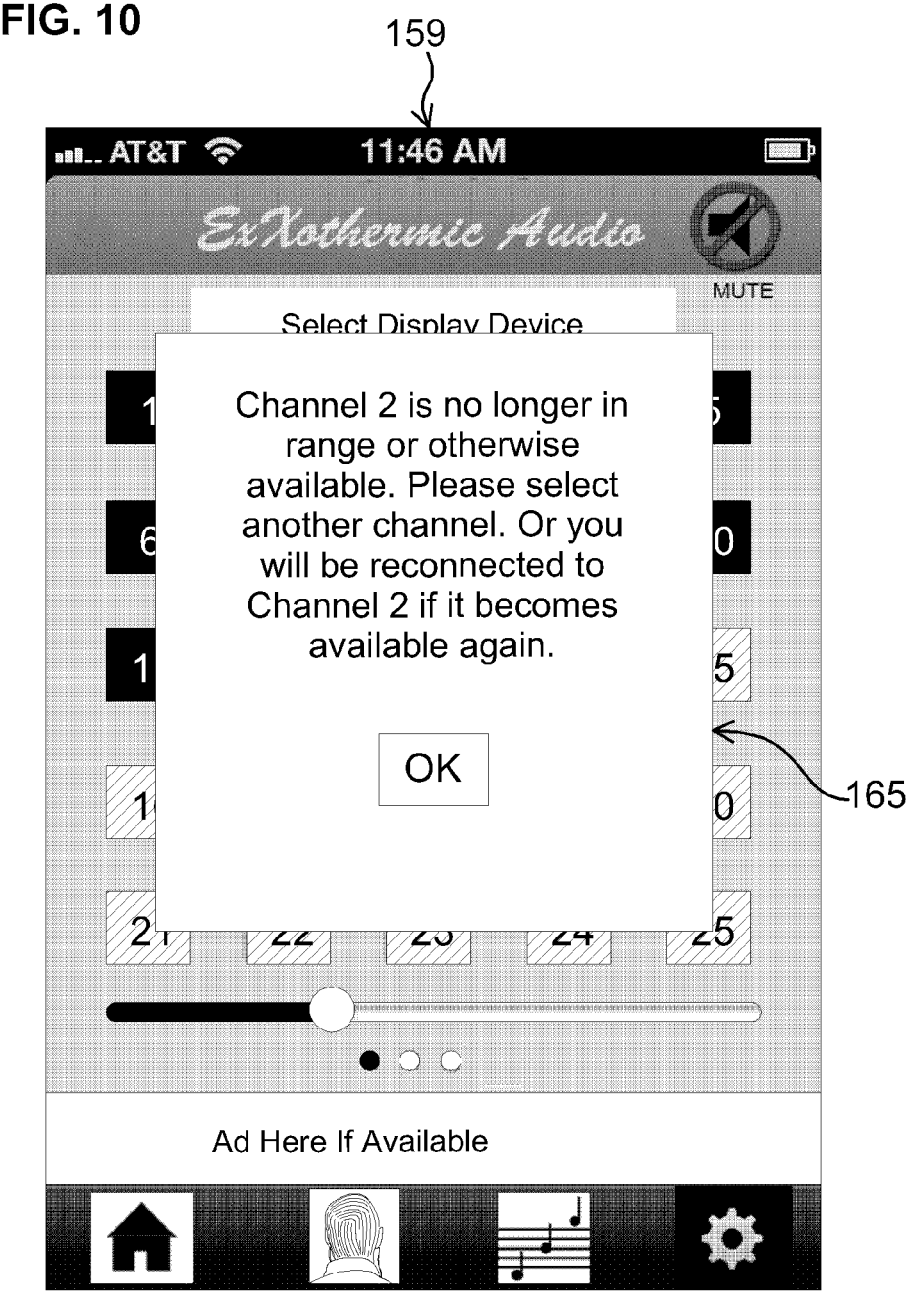

While the user 102 is listening to the audio stream, the user 102 may move around within the environment 100 or even temporarily leave the environment 100. In doing so, the user 102 may go out of range of the network access point 105 that is supplying the audio stream. For example, the user 102 may go to the restroom in the environment 100 or go outside the environment 100 to smoke or to retrieve something from the user's car and then return to the user's previous location within the environment 100. In this case, while the user device 103 is out of range of the network access point 105 intended to serve the desired audio stream, the corresponding server 104 may route the audio stream through another server 104 to another network access point 105 that is within range of the user device 103, so that the user device 103 may continue to receive the audio stream relatively uninterrupted. Alternatively, the application may present another screen to inform the user 102 of what has happened. For example, another pop-up window 165 may appear over the screen 159, as shown in FIG. 10. In this example, the pop-up window 165 generally informs the user 102 that the network access point 105 is out of range or that the audio stream is otherwise no longer available. Optionally, the application may inform the user 102 that it will reconnect to the network access point 105 and resume playing the audio stream if it becomes available again. Additionally, the application may prompt the user 102 to select a different audio stream if one is available. In some embodiments, the application may drop into a power save mode until the user 102 selects an available display identifier 160.

In some embodiments, more than one of the network access points 105 may provide the same audio stream or service the same display device 101. Alternatively, the servers 104 may keep track of which of the display devices 101 are presenting the same video stream, so that the corresponding audio streams, which may be serviced by different network access points 105, are also the same. In either case, multiple network access points 105 located throughout the environment 100 may be able to transmit the same audio streams. Therefore, some embodiments may allow for the user devices 103 to switch to other network access points 105 as the user 102 moves through the environment 100 (or relatively close outside the environment 100) in order to maintain the selected audio stream.

The SSIDs of more than one network access point 105 may be the same to facilitate such roaming. This feature may superficially resemble the function of cell phone systems that allow cell phones to move from one cell transceiver to another without dropping a call.

In some embodiments, the application on the user device 103 may run in the background, so the user 102 can launch a second application on the user device 103. However, if the second application logs into an SSID not associated with the network access points 105 or servers 104 for the audio streaming, then the audio streaming may be disabled. In this case, another screen or pop-up window (not shown) may be used to alert the user 102 of this occurrence. However, if the user device 103 has already lost contact with the network access point 105 (e.g. the user 102 has walked out of range), then the application may allow the changing of the SSID without interference.

Figure 11:
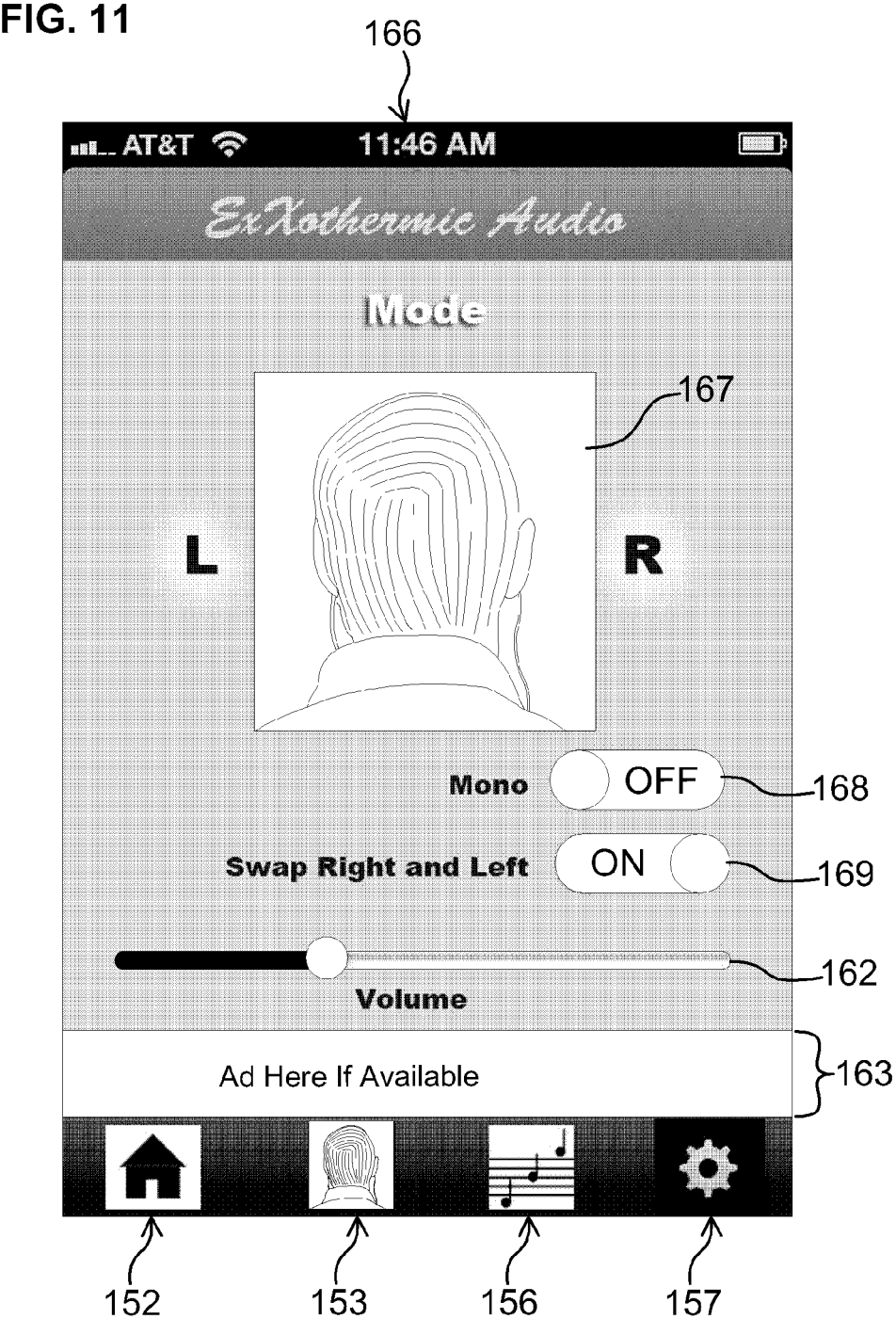

An example mode selection screen 166 for setting a mode of listening to the audio stream is shown in FIG. 11. The application on the user device 103 may present this or a similar screen when the user 102 presses the mode icon 153, mentioned above. In this example, an enlarged image 167 of the mode icon 153 (e.g. an image or drawing of the back of a person's head with wired earbuds attached to the person's ears) is shown in about the middle of the screen 166. The letters "L" and "R" indicate the left and right earbuds or individual audio streams. A touch switch 168 is provided for selecting a mono, rather than a stereo, audio stream if desired. Another touch switch 169 is provided for switching the left and right individual audio streams if desired. Additionally, the volume slider bar 162, the ad section 163 and some of the icon buttons 152, 153, 156 and 157 are provided. Other embodiments may provide other listening mode features for selection or adjustment or other means for making such selections and adjustments. In still other embodiments, the application does not provide for any such selections or adjustments.

Figure 12:
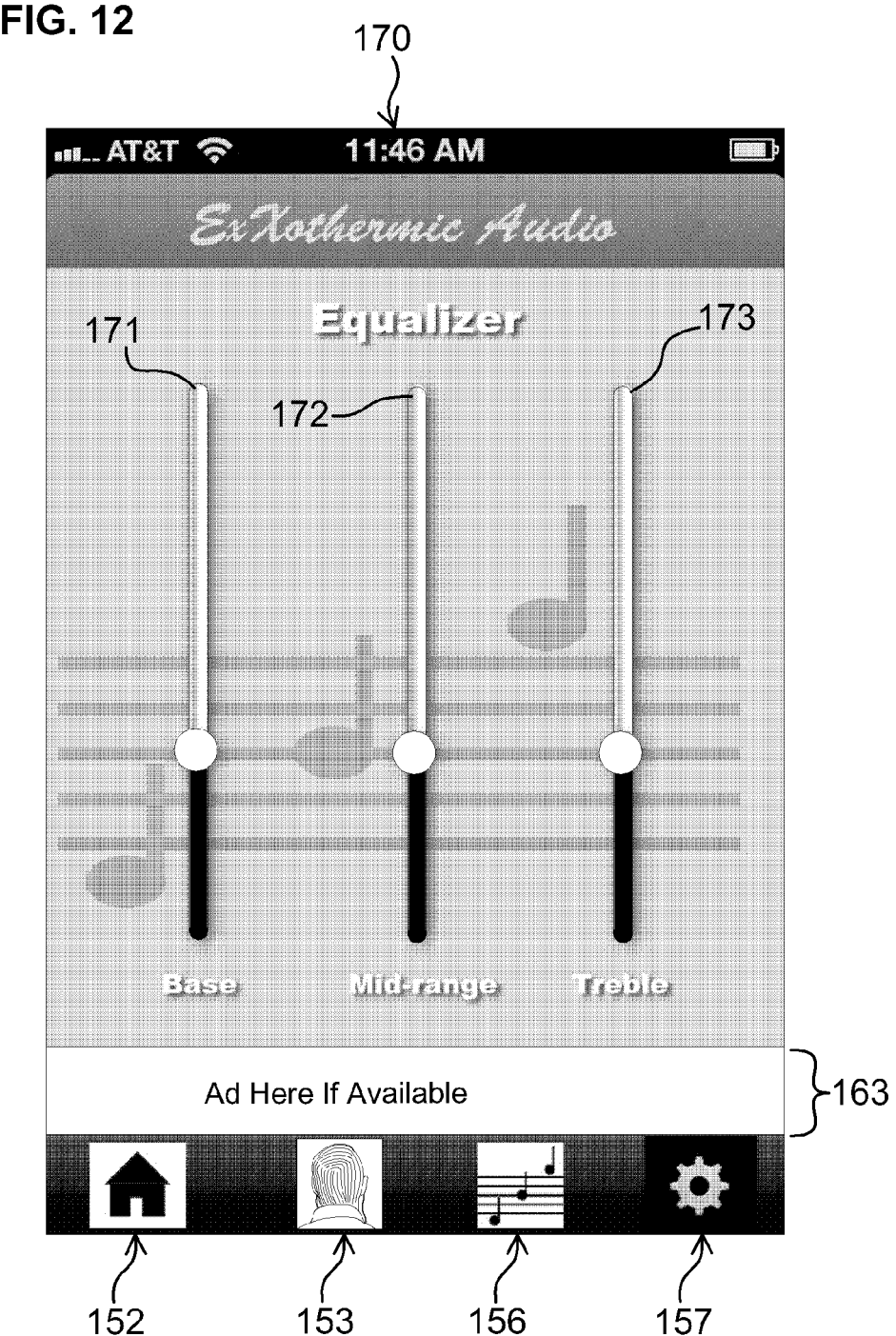

An example equalizer selection screen 170 for setting volume levels for different frequencies of the audio stream is shown in FIG. 12. The application on the user device 103 may present this or a similar screen when the user 102 presses the equalizer icon 156, mentioned above. In this example, slider bars 171, 172 and 173 are provided for adjusting base, mid-range and treble frequencies, respectively. Additionally, the ad section 163 and some of the icon buttons 152, 153, 156 and 157 are provided. Other embodiments may provide other equalizer features for selection or adjustment or other means for making such selections and adjustments. In still other embodiments, the application does not provide for any such selections or adjustments.

Figure 13:
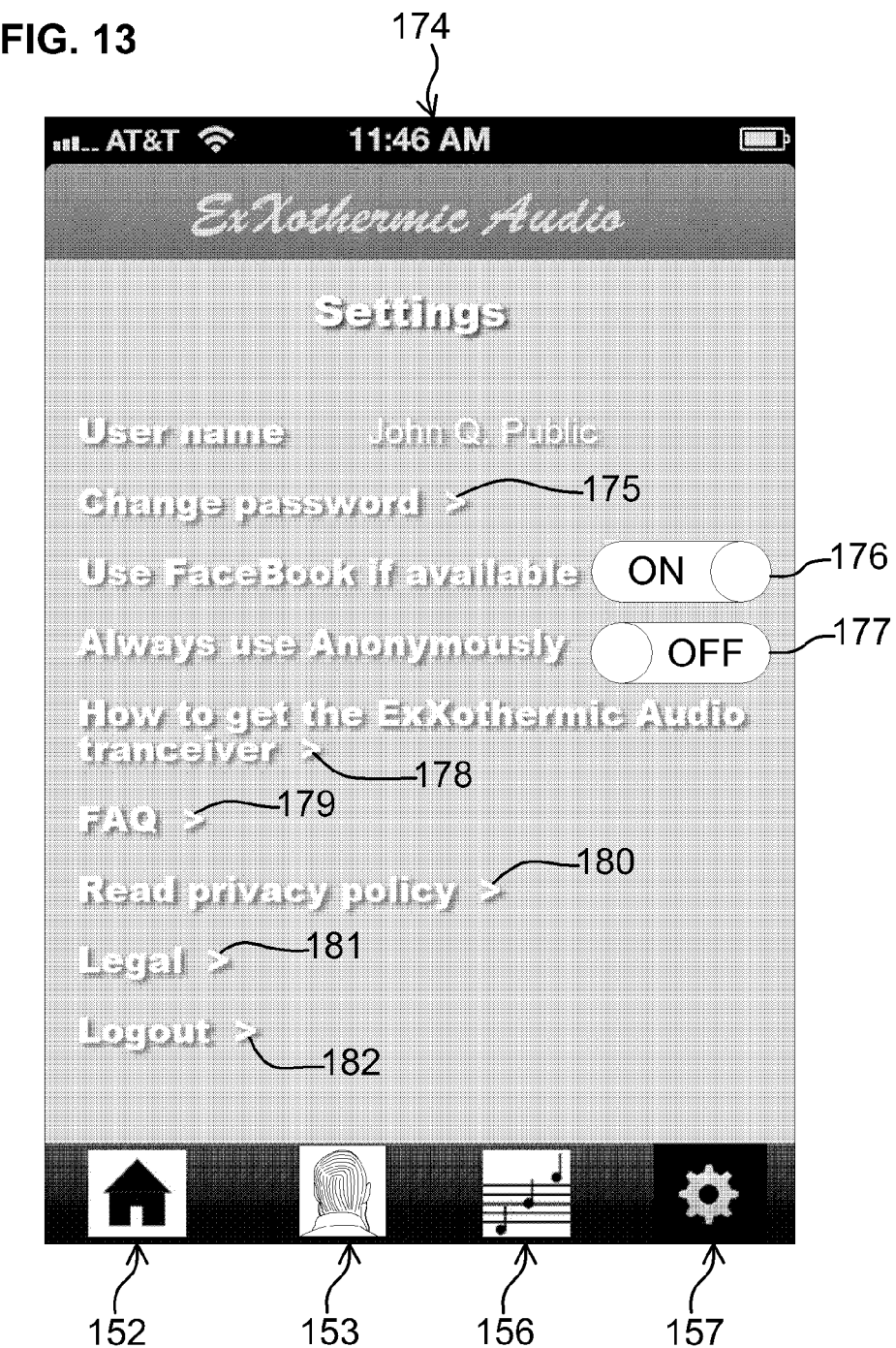

An example settings selection screen 174 for setting various preferences for, or obtaining various information about, the application is shown in FIG. 13. The application on the user device 103 may present this or a similar screen when the user 102 presses the settings icon 157, mentioned above. In this example, the username of the user 102 is "John Q. Public." An option 175 is provided for changing the user's password. An option 176 is provided for turning on/off the use of social networking features (e.g. Facebook is shown). An option 177 for turning on/off a setting to login anonymously. An option 178 is provided that may lead the users 102 to further information on how to acquire such services for their own environments 100. An option 179 is provided that may lead the users 102 to a FAQ (answers to Frequently Asked Questions) regarding the available services. An option 180 is provided that may lead the users 102 to a text of the privacy policy of the owners of the environment 100 or operators of the servers 104 regarding the services. An option 181 is provided that may lead the users 102 to a text of a legal policy or disclaimer with regard to the services. Additionally, an option 182 is provided for the users 102 to logout of the services. Other embodiments may provide for other application settings or information.

Figure 14:
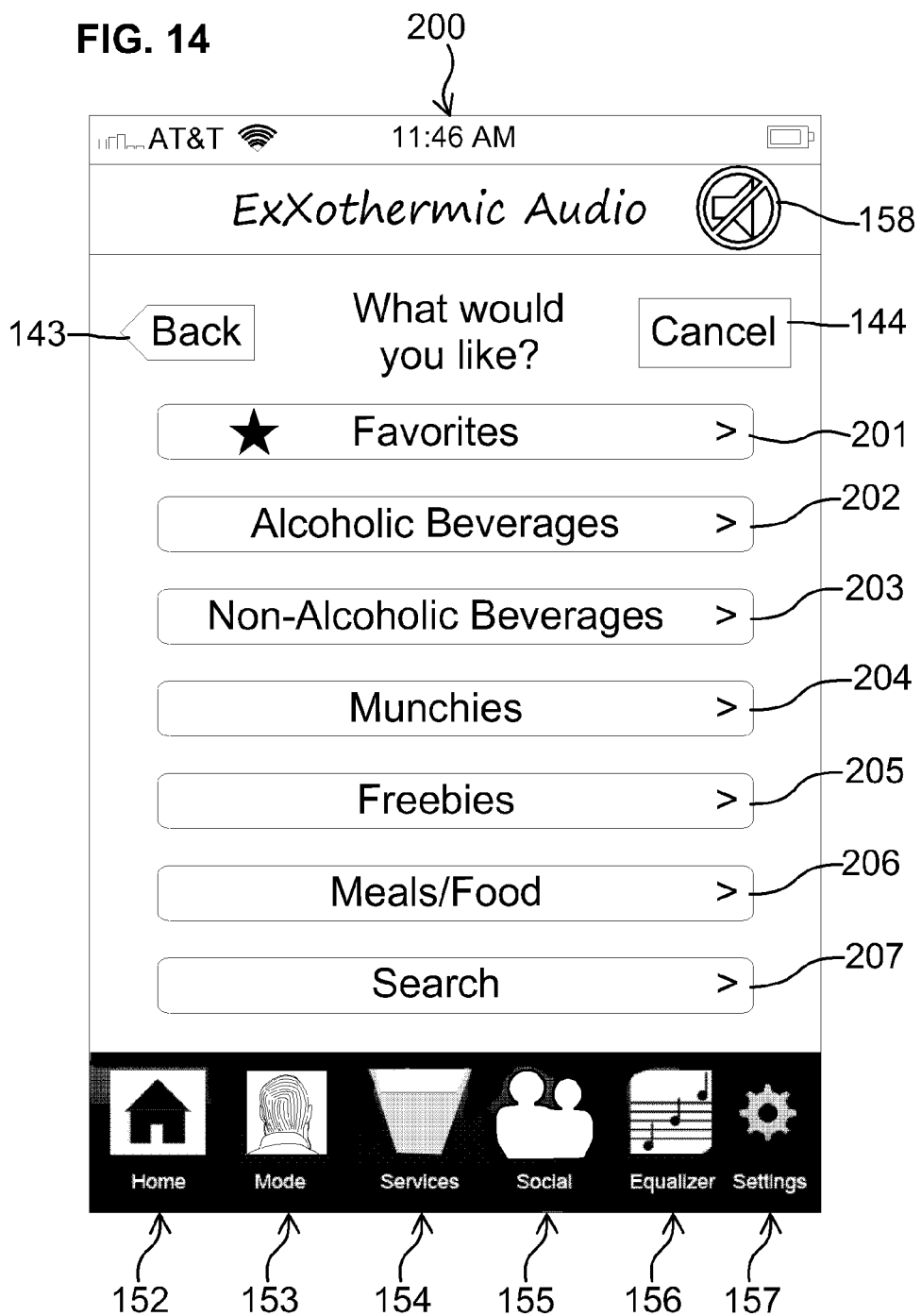

For embodiments in which the environment 100 is a bar or restaurant type of establishment, an initial food and drinks ordering screen 200 for using the application to order food and drinks from the establishment is shown in FIG. 14. The application on the user device 103 may present this or a similar screen when the user 102 presses the "order food and drinks" touch screen button 145 or the services icon 154, mentioned above. In this example, a "favorites" option 201 is provided for the user 102 to be taken to a list of items that the user 102 has previously or most frequently ordered from the current environment 100 or that the user 102 has otherwise previously indicated are the user's favorite items. A star icon is used to readily distinguish "favorites" in this and other screens. An "alcoholic beverages" option 202 is provided for the user 102 to be taken to a list of available alcoholic beverages. Information provided by the user 102 in other screens (not shown) or through social networking services may help to confirm whether the user 102 is of the legal drinking age. A "non-alcoholic beverages" option 203 is provided for the user 102 to be taken to a list of available non-alcoholic beverages, such as sodas, juices, milk, water, etc. A "munchies" option 204 is provided for the user 102 to be taken to a list of available snacks, hors d'oeuvres, appetizers or the like. A "freebies" option 205 is provided for the user 102 to be taken to a list of free items that the user 102 may have qualified for with "loyalty points" (mentioned above), specials or other giveaways. A "meals/food" option 206 is provided for the user 102 to be taken to a list of available food menu items. A "search" option 207 is provided for the user 102 to be taken to a search screen, as described below with reference to FIGS. 15 and 16. Additionally, the "Back" (at 143) and "Cancel" (at 144) touch screen buttons, the mute icon 158 and the icon control buttons 152-157 are also provided (mentioned above). Other embodiments may provide for other options that are appropriate for an environment 100 in which food and drink type items are served.

Figure 15:
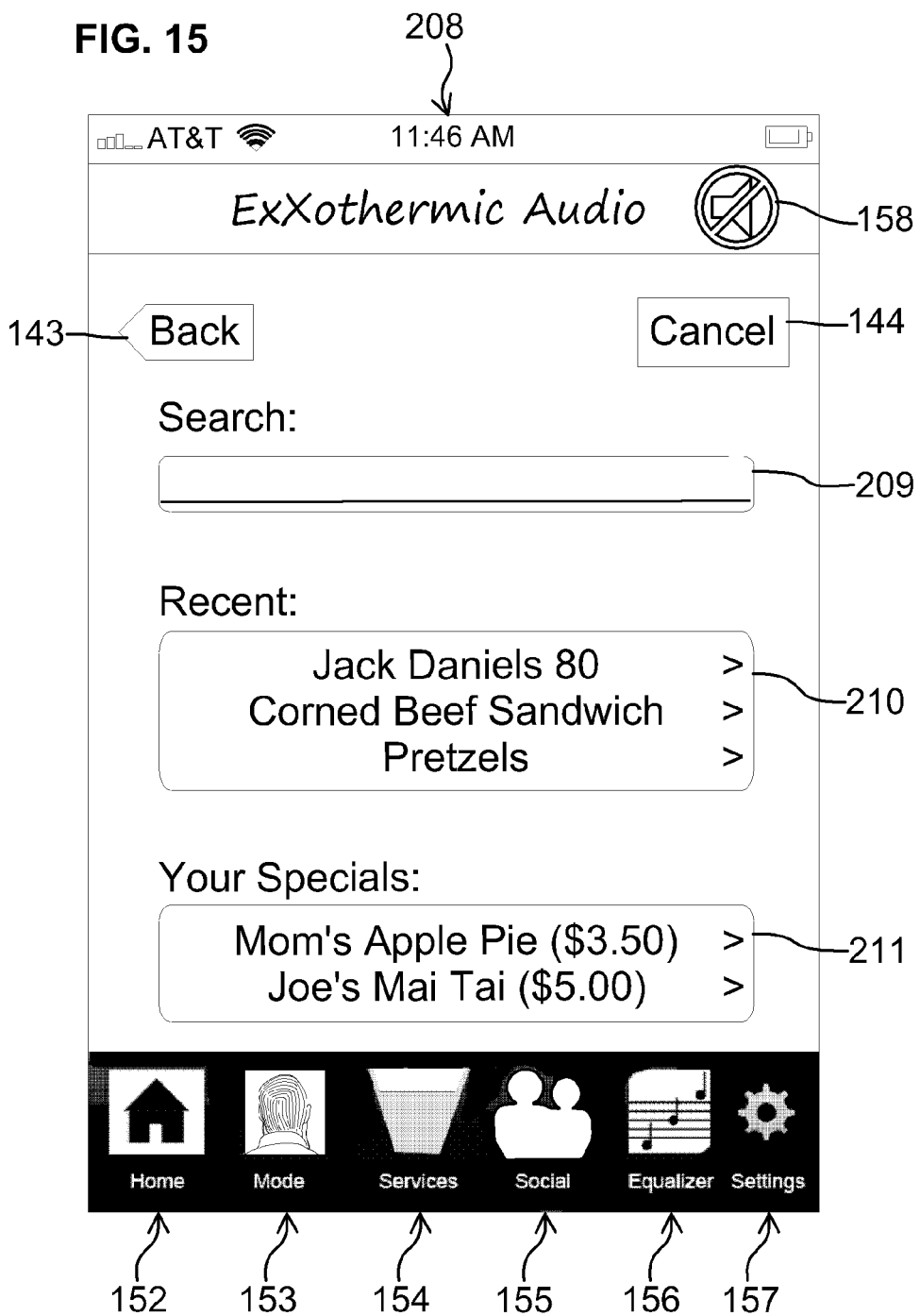

In this example, if the user 102 selects the "search" option 207, then the user 102 may be presented with a search screen 208, as shown in FIG. 15. Tapping on a search space 209 may cause another touch screen keyboard (e.g. as in FIG. 6 at 137) to appear below the search space 209, so the user 102 can enter a search term. Alternatively, the user 102 may be presented with a section 210 showing some of the user's recently ordered items and a section 211 showing some specials available for the user 102, in case any of these items are the one that the user 102 intended to search for. The user 102 could then bypass the search by selecting one or more of these items in section 210 or 211. Additionally, the "Back" (at 143) and "Cancel" (at 144) touch screen buttons, the mute icon 158 and the icon control buttons 152-157 are also provided (mentioned above). Other embodiments may present other search options that may be appropriate for the type of environment 100.

Figure 16:
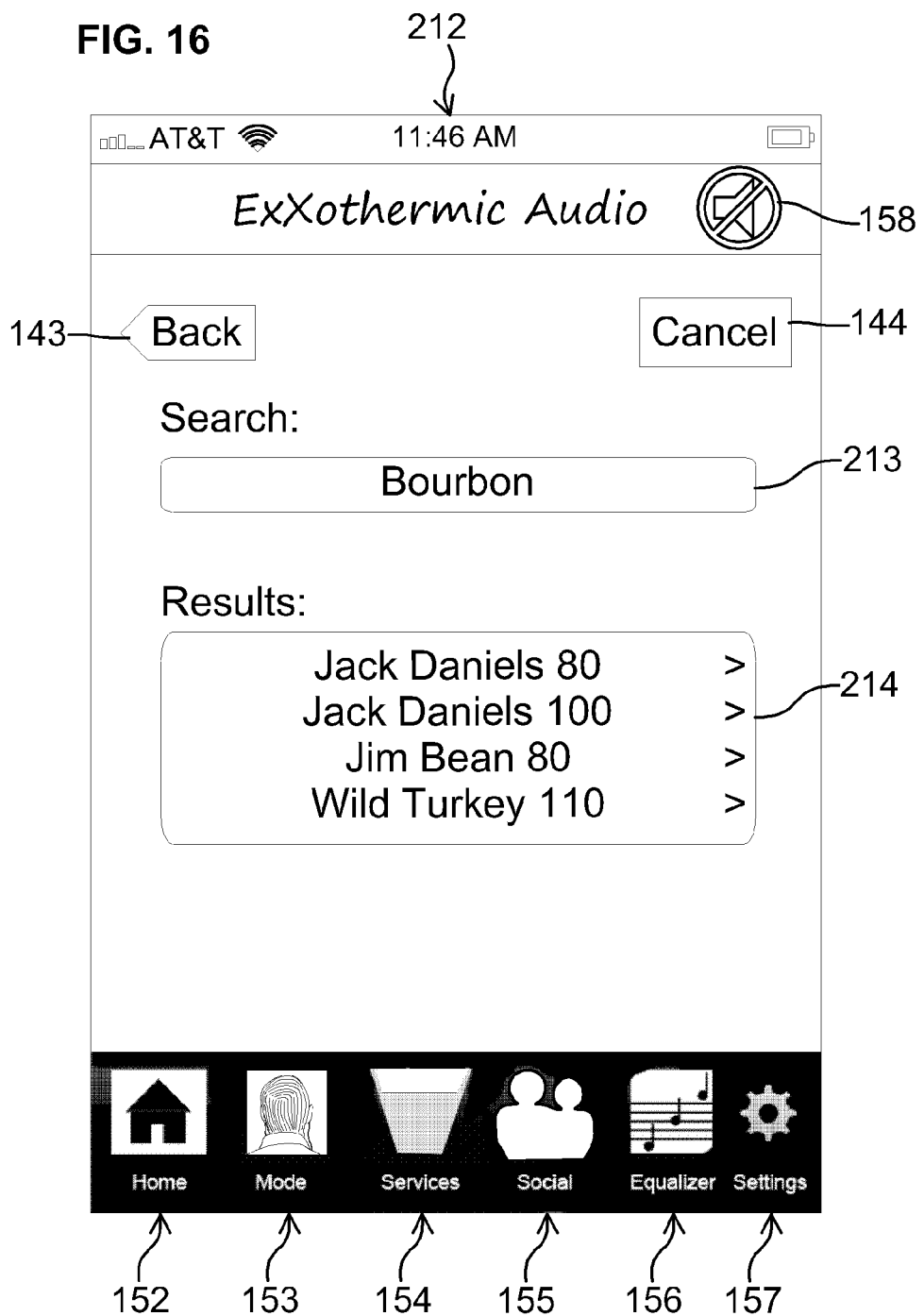

In this example, if the user 102 enters a search term in the search screen 208, then the user 102 may be presented with a results screen 212, as shown in FIG. 16. In this case, the search term entered by the user 102 is shown in another search space 213, and search results related to the search term are shown in a results space 214. The user 102 may then select one of these items by pressing on it or return to the previous screen to do another search (e.g. pressing the "back" touch screen button 143) or cancel the search and return to the initial food and drinks ordering screen 200 or the general action selection screen 142 (e.g. pressing the "cancel" touch screen button 144). Additionally, the mute icon 158 and the icon control buttons 152-157 are also provided (mentioned above). Other embodiments may present other results options that may be appropriate for the type of environment 100.

Figure 17:
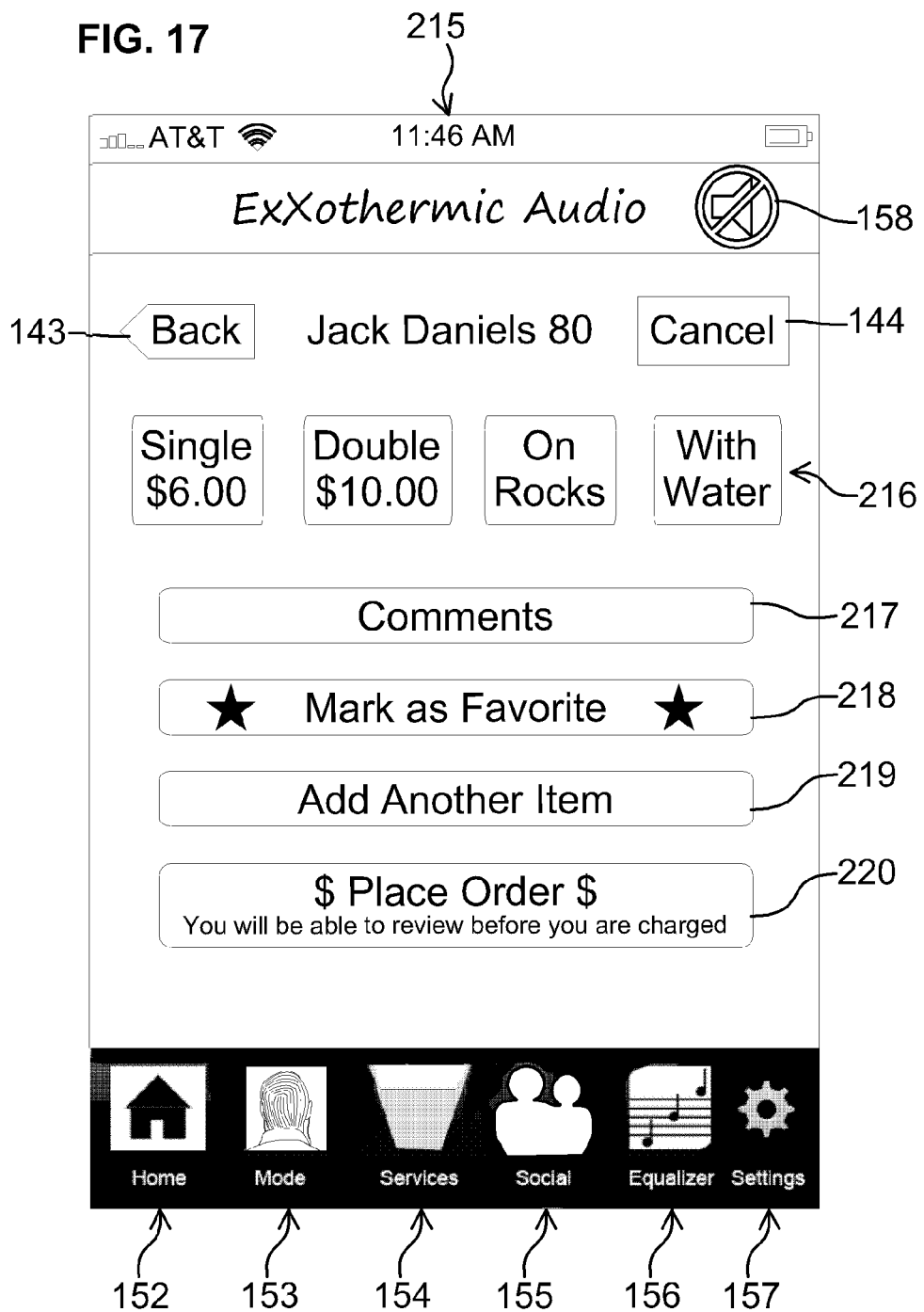
Figure 18:
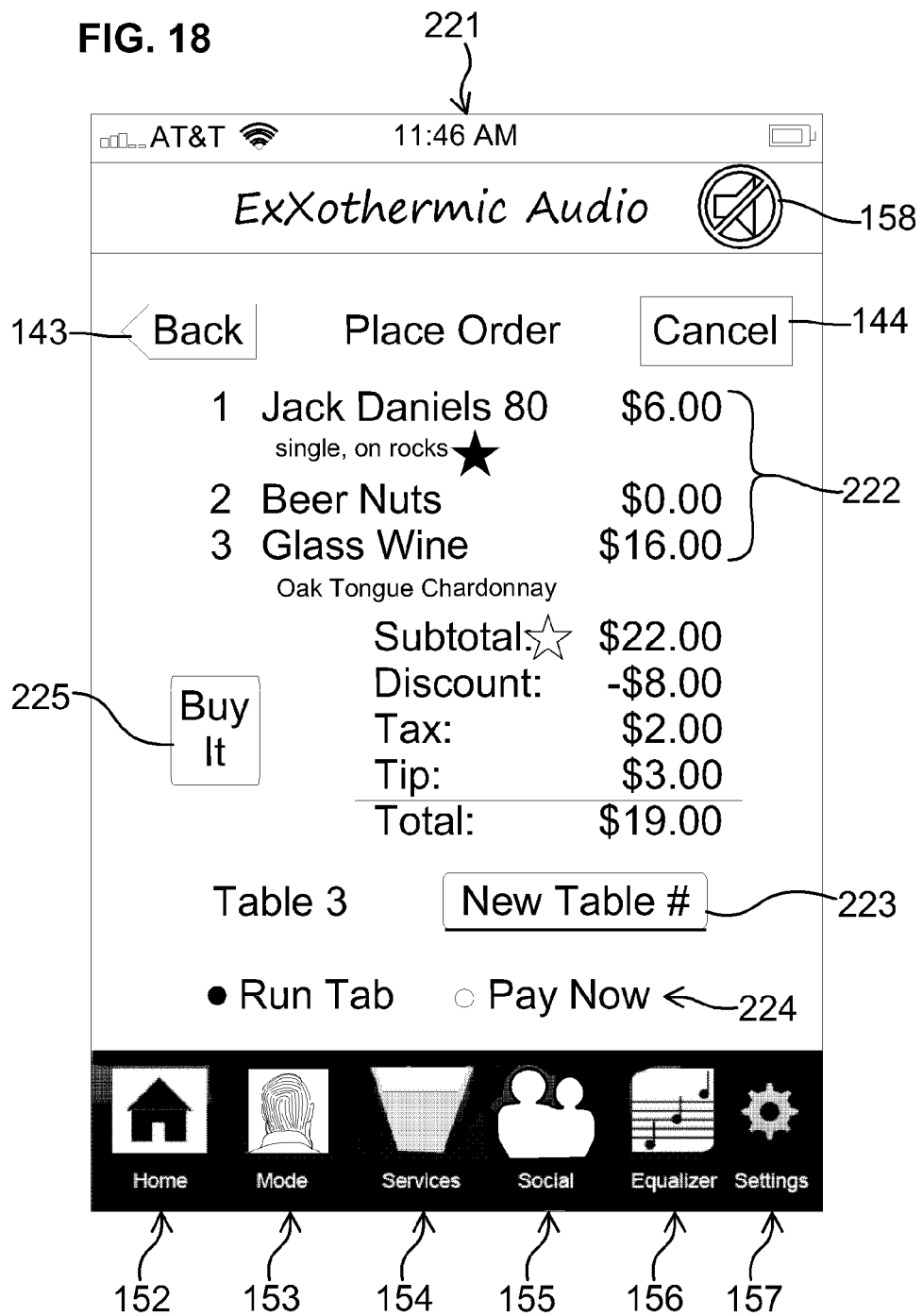

In this example, if the user 102 selects an item to purchase, either from the search or results screens 208 or 212 or from any of the screens to which the user 102 was directed by any of the options 201-206 on the initial food and drinks ordering screen 200, then the user 102 may be presented with an item purchase screen 215, as shown in FIG. 17. A set of order customization options 216 may be provided for the user 102 to make certain common customizations of the order. Alternatively, a "comments" option 217 may be provided for the user 102 to enter any comments or special instructions related to the order. Another option 218 may be provided for the user 102 to mark this item as one of the user's favorites, which may then show up when the user 102 selects the "favorites" option 201 on the initial food and drinks ordering screen 200 in the future. Another option 219 may be provided for the user 102 to add another item to this order, the selection of which may cause the user 102 to be returned to the initial food and drinks ordering screen 200. A "place order" option 220 may be provided for the user 102 to go to another screen on which the user 102 may review the entire order, as well as make selections to be changed for the order. Additionally, the "Back" (at 143) and "Cancel" (at 144) touch screen buttons, the mute icon 158 and the icon control buttons 152-157 are also provided (mentioned above). Other embodiments may present other options for allowing the user 102 to customize the selected item as may be appropriate.

In this example, if the user 102 chooses to purchase any items through the application on the user device 103, e.g. by pressing the "place order" option 220 on screen 215, the user 102 may be presented with a screen 221 with which to place or confirm the order. In this example, the user 102 has selected three items 222 to purchase, one of which is free since it is perhaps a freebie provided to all customers or perhaps the user 102 has earned it with loyalty points (mentioned above). The user 102 may change any of the items 222 by pressing the item on the screen 221. Favorite items may be marked with the star, and there may be a star touch screen button to enable the user to select all of the items 222 as favorites. Any other discounts the user 102 may have due to loyalty points or coupons may be shown along with a subtotal, tax, tip and total. The tip percentage may be automatically set by the user 102 within the application or by the owners/operators of the environment 100 through the servers 104. The user's table identifier (e.g. for embodiments with tables in the environment 100) is also shown along with an option 223 to change the table identifier (e.g. in case the user 102 moves to a different table in the environment 100). Selectable options 224 to either run a tab or to pay for the order now may be provided for the user's choice. The order may be placed through one of the servers 104 when the user 102 presses a "buy it" touch screen button 225. The order may then be directed to a user device 103 operated or carried by a manager, bartender or wait staff person within the environment 100 in order to fill the order and to present the user 102 with a check/invoice when necessary. In some embodiments, payment may be made through the application on the user device 103 to the servers 104, so the wait staff person does not have to handle that part of the transaction. Additionally, the "Back" (at 143) and "Cancel" (at 144) touch screen buttons, the mute icon 158 and the icon control buttons 152-157 are also provided (mentioned above). Other embodiments may present other options for allowing the user 102 to complete, confirm or place the order as may be appropriate.

Figure 19:
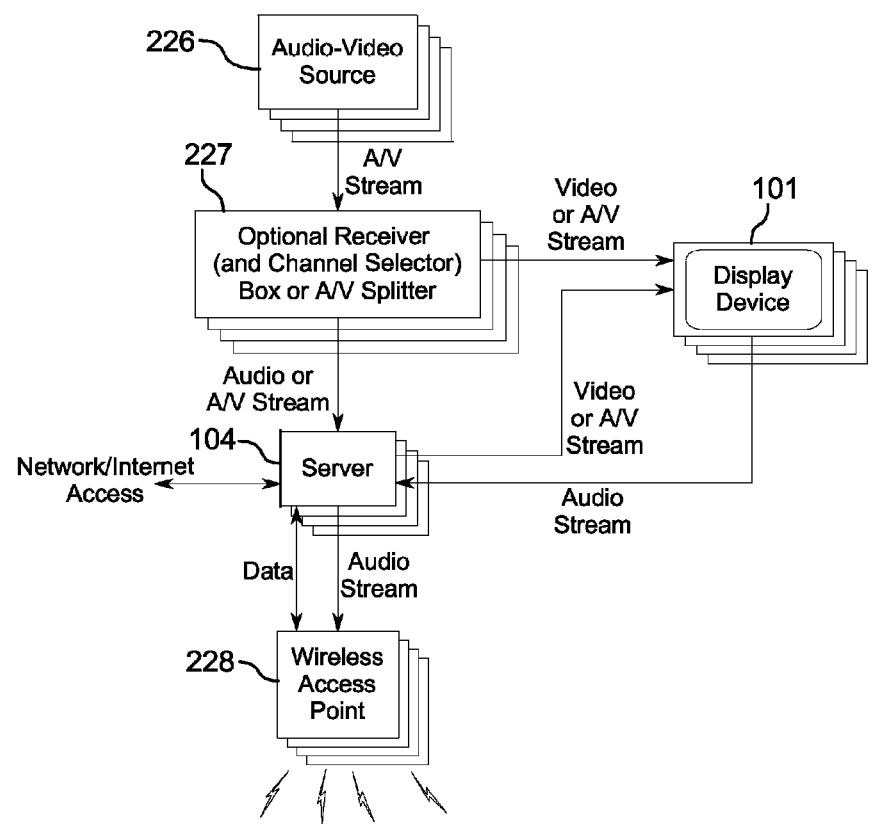
FIG. 19 is a simplified schematic diagram of at least some of the A/V equipment that may be used in the environment shown in FIG. 1 in accordance with an embodiment of the present invention.

An example architecture for connecting at least some of the A/V equipment within the environment 100 is shown in FIG. 19 in accordance with an embodiment of the present invention. (Other embodiments in which the functions of the server 104 are not within the environment 100 are described elsewhere.) The A/V equipment generally includes one or more A/V sources 226, one or more optional receiver (and channel selector) boxes or A/V stream splitters (the optional receiver) 227, one or more of the display devices 101, one or more of the servers 104 and one or more wireless access points (WAPs) 228 (e.g. the network access points 105 of FIG. 1). It is understood, however, that the present invention is not necessarily limited to the architecture shown. Additionally, some variations on the illustrated architecture may render some of the components or connections unnecessary or optional.

The A/V sources 226 may be any available or appropriate A/V stream source. For example, the A/V sources 226 may be any combination of cable TV, TV antennas, over-the-air TV broadcasts, satellite dishes, VCR/DVD/Blue-ray/DVR devices or network devices (e.g. for Internet-based video services). The A/V sources 226, thus, provide one or more A/V streams, such as television programs, VCR/DVD/Blue-ray/DVR videos, Internet-based content, etc.

The optional receivers 227 may be any appropriate or necessary set top boxes or intermediary devices as may be used with the A/V sources 226. The receivers 227 are considered optional, since some such A/V sources 226 do not require any such intermediary device. For embodiments that do not include the optional receivers 227, the A/V streams from the A/V sources 226 may pass directly to the display devices 101 or to the servers 104 or both. To pass the A/V streams to both, one or more A/V splitters (e.g. a coaxial cable splitter, HDMI splitter, etc.) may be used in place of the optional receivers 227.

Some types of the optional receivers 227 have separate outputs for audio and video, so some embodiments pass the video streams only to the display devices 101 and the audio streams only to the servers 104. On the other hand, some types of the optional receivers 227 have outputs only for the combined audio and video streams (e.g. coaxial cables, HDMI, etc.), so some embodiments pass the A/V streams only to the display devices 101, only to the servers 104 or to both (e.g. through multiple outputs or A/V splitters). For those embodiments in which the entire A/V streams are provided only to the display devices 101 (from either the A/V sources 226 or the optional receivers 227), the audio stream is provided from the display devices 101 (e.g. from a headphone jack) to the servers 104. For those embodiments in which the entire A/V streams are provided only to the servers 104 (from either the A/V sources 226 or the optional receivers 227), the video stream (or A/V stream) is provided from the servers 104 to the display devices 101.

The servers 104 provide the audio streams (e.g. properly encoded, packetized, etc.) to the WAPs 228. The WAPs 228 transmit the audio streams to the user devices 103. Depending on the embodiment, the WAPs 228 also transmit data between the servers 104 and the user devices 103 for the various other functions described herein. In some embodiments, the servers 104 also transmit and receive various data through another network or the Internet. In some embodiments, a server 104 may transmit an audio stream to another server 104 within a network, so that the audio stream can be further transmitted through a network access point 105 that is within range of the user device 103.

Figure 20:
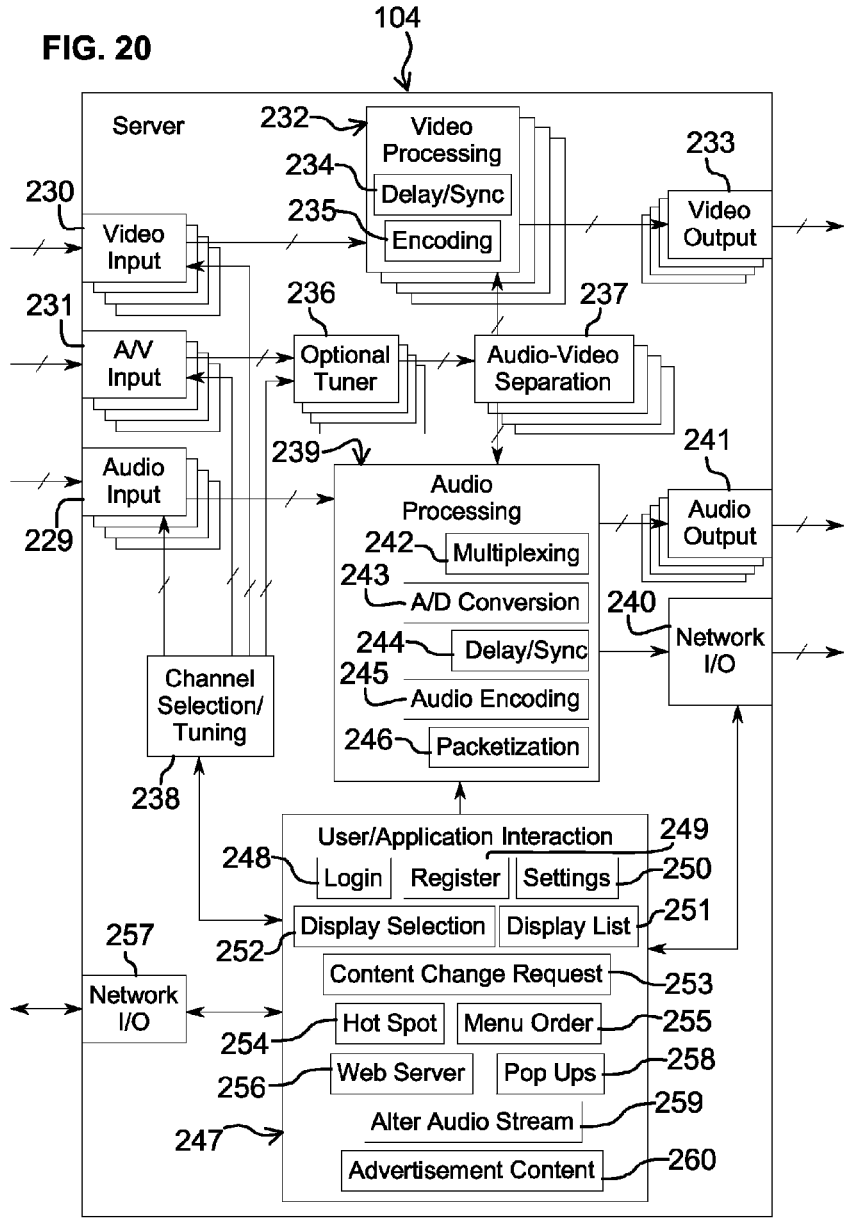
FIG. 20 is a simplified diagram of functions provided through at least some of the A/V equipment used in the environment shown in FIG. 1 in accordance with an embodiment of the present invention.

An example functional block diagram of the server 104 is shown in FIG. 20 in accordance with an embodiment of the present invention. It is understood that the present invention is not necessarily limited to the functions shown or described. Instead, some of the functions may be optional or not included in some embodiments, and other functions not shown or described may be included in other embodiments. Additionally, some connections between functional blocks may be different from those shown and described, depending on various embodiments and/or the types of physical components used in the server 104.

Each of the illustrated example functional blocks and connections between functional blocks generally represents any appropriate physical or hardware components or combination of hardware components and software that may be necessary for the described functions. For example, some of the functional blocks may represent audio processing circuitry, video processing circuitry, microprocessors, memory, software, networking interfaces, I/O ports, etc. In some embodiments, some functional blocks may represent more than one hardware component, and some functional blocks may be combined into a fewer number of hardware components.

In some embodiments, some or all of the functions are incorporated into one or more devices that may be located within the environment 100, as mentioned above. In other embodiments, some or all of the functions may be incorporated in one or more devices located outside the environment 100 or partially on and partially off premises, as mentioned above.

In the illustrated example, the server 104 is shown having one or more audio inputs 229 for receiving one or more audio streams, one or more video inputs 230 for receiving one or more video streams and one or more combined A/V inputs 231 for receiving one or more A/V streams. These input functional blocks 229-231 generally represent one or more I/O connectors and circuitry for the variety of different types of A/V sources 226 that may be used, e.g. coaxial cable connectors, modems, wireless adapters, HDMI ports, network adapters, Ethernet ports, stereo audio ports, component video ports, S-video ports, etc. Some types of video content may be provided through one of these inputs (from one type of A/V source 226, e.g. cable or satellite) and the audio content provided through a different input (from another type of A/V source 226, e.g. the Internet). Multiple language audio streams, for example, may be enabled by this technique. The video inputs 230 and A/V inputs 231 may be considered optional, so they may not be present in some embodiments, since the audio processing may be considered the primary function of the servers 104 in some embodiments. It is also possible that the social interaction and/or food/drink ordering functions are considered the primary functions in some embodiments, so the audio inputs 229 may potentially also be considered optional.

For embodiments in which the server 104 handles the video streams in addition to the audio streams, one or more video processing functional blocks 232 and one or more video outputs 233 are shown. The video outputs 233 may include any appropriate video connectors, such as coaxial cable connectors, wireless adapters, HDMI ports, network adapters, Ethernet ports, component video ports, S-video ports, etc. for connecting to the display devices 101. The video processing functional blocks 232 each generally include a delay or synchronization functional block 234 and a video encoding functional block 235. In some embodiments, however, the sum of the video processing functions at 232 may simply result in passing the video stream directly through or around the server 104 from the video inputs 230 or the A/V inputs 231 to the video outputs 233. In other embodiments, the video stream may have to be output in a different form than it was input, so the encoding function at 235 enables any appropriate video stream conversions (e.g. from an analog coaxial cable input to an HDMI output or any other conversion). Additionally, since the video streams and audio streams do not necessarily pass through the same equipment, it is possible for the syncing of the video and audio streams to be off by an intolerable amount by the time they reach the display devices 101 and the user devices 103, respectively. The delay or synchronization functions at 234, therefore, enable synchronization of the video and audio streams, e.g. by delaying the video stream by an appropriate amount. For example, a generator may produce a video test pattern so that the appropriate delay can be introduced into the video stream, so that the video and audio are synchronized from the user's perspective (lip sync'd).

In this example, one or more optional tuner functional blocks 236 (e.g. a TV tuner circuit) may be included for a video input 230 or A/V input 231 that requires tuning in order to extract a desired video stream or A/V stream. Additionally, for embodiments in which the video and audio streams are received together (e.g. through a coaxial cable, HDMI, etc.), an audio-video separation functional block 237 may be included to separate the two streams or to extract one from the other. Furthermore, a channel selection/tuning functional block 238 may control the various types of inputs 229-231 and/or the optional tuners at 236 so that the desired audio streams may be obtained. Thus, some of the functions of the display devices 101 (as a conventional television) or of the optional receivers 227 may be incorporated into the servers 104. However, if only one audio stream for each input 229-231 is received, then the tuners at 236 and the channel selection/tuning functions at 238 may be unnecessary.

The one or more audio streams (e.g. from the audio inputs 229, the A/V inputs 231 or the audio-video separation functional block 237) are generally provided to an audio processing functional block 239. The audio processing functional block 239 generally converts the audio streams received at the inputs 229 and/or 231 into a proper format for transmission through a network I/O adapter 240 (e.g. an Ethernet port, USB port, etc.) to the WAPs 228 or network access points 105. Additionally, if it is desired to provide the audio streams to the display devices 101 as well, then the audio streams may also simply be transmitted through the audio processing functional block 239 or directly from the audio or A/V inputs 229 or 231 or the audio-video separation functional block 237 to one or more audio outputs 241 connected to the display devices 101.

Depending on the number, type and encoding of the audio streams, some of the illustrated audio processing functions at 239 may be optional or unnecessary. In this example, however, the audio processing functional block 239 generally includes a multiplexing functional block 242, an analog-to-digital (A/D) conversion functional block 243, a delay/synchronization functional block 244, an audio encoding (including perceptual encoding) functional block 245 and a packetization functional block 246. The functions at 242-246 are generally, but not necessarily, performed in the order shown from top to bottom in FIG. 20.

If the server 104 receives multiple components of one audio stream (e.g. left and right stereo components, Dolby Digital 5.1™, etc.), then the multiplexing function at 242 multiplexes the two streams into one for eventual transmission to the user devices 103. Additionally, if the server 104 receives more than one audio stream, then the multiplexing function at 242 potentially further multiplexes all of these streams together for further processing. If the server 104 receives more audio streams than it has been requested to provide to the user devices 103, then the audio processing functional block 239 may process only the requested audio streams, so the total number of multiplexed audio streams may vary during operation of the server 104.

If the received audio streams are analog, then the A/D conversion function at 243 converts the analog audio signals (using time slicing if multiplexed) into an appropriate digital format. On the other hand, if any of the audio streams are received in digital format, then the A/D conversion function at 243 may be skipped for those audio streams. If all of the audio streams are digital (e.g. all from an Internet-based source, etc.), then the A/D conversion functional block 243 may not be required.

Again, since the video streams and audio streams do not necessarily pass through the same equipment, it is possible for the syncing of the video and audio streams to be off by an intolerable amount by the time they reach or pass through the display devices 101 and the user devices 103, respectively. The delay or synchronization functions at 244, therefore, enable synchronization of the video and audio streams, e.g. by delaying the audio stream by an appropriate amount. (Alternatively, the audio delay/synchronization functions may be in the user devices 103, e.g. as describe below.) For example, a generator may produce an audio test pattern so that the appropriate delay can be introduced into the audio stream, so that the video and audio are synchronized from the user's perspective (lip sync'd). The delay/synchronization functional block 244 may work in cooperation with the delay/synchronization functional block 234 in the video processing functions at 232. The server 104, thus, may use either or both delay/synchronization functional blocks 234 and 244 to synchronize the video and audio streams. Alternatively, the server 104 may have neither delay/synchronization functional block 234 or 244 if synchronization is determined not to be a problem in all or most configurations of the overall A/V equipment (e.g. 101 and 103-105). Alternatively, the lip sync function may be external to the servers 104. This alternative may be appropriate if, for instance, lip sync calibration is done at setup by a technician. In some embodiments, if the audio and video streams are provided over the Internet, the audio stream may be provided with a sufficiently large lead over the video stream that synchronization could always be assured by delaying the audio stream at the server 104 or the user device 103.

The delay/synchronization functions at 234 and 244 generally enable the server 104 to address fixed offset and/or any variable offset between the audio and video streams. The fixed offset is generally dependant on the various devices between the A/V source 226 (FIG. 19) and the display devices 101 and the user devices 103. The display device 101, for example, may contain several frames of image data on which it would do advanced image processing in order to deliver the final imagery to the screen. At a 60 Hz refresh rate and 5 frames of data, for example, then a latency of about 83 ms may occur.

There are several ways to assure that the video and audio streams are synchronized from the perspective of the user 102. One method is to have the user 102 manually adjust the audio delay using a control in the application on the user device 103, which may send an appropriate control signal to the delay/synchronization functional block 244. This technique may be implemented, for instance, with a buffer of adjustable depth.

A second method is for the delay/synchronization functions at 234 and 244 to include a lip sync calibration generator, or for a technician to use an external lip-sync calibration generator, with which to calibrate the video and audio streams. The calibration may be done so that for each type of user device 103 and display device 101, the application sets the audio delay (via an adjustable buffer) to an appropriate delay value. For instance, a technician at a particular environment 100, may connect the calibration generator and, by changing the audio delay, adjust the lip sync on a representative user device 103 to be within specification. On the other hand, some types of the user devices 103 may be previously tested, so their internal delay offsets may be known. The server 104 may store this information, so when one of the user devices 103 accesses the server 104, the user device 103 may tell the server 104 what type of user device 103 it is. Then the server 104 may set within the delay/synchronization functional block 244 (or transmit to the application on the user device 103) the proper calibrated audio delay to use. Alternatively, the application on each user device 103 may be provided with data regarding the delay on that type of user device 103. The application may then query the server 104 about its delay characteristics, including the video delay, and thus be able to set the proper buffer delay within the user device 103 or instruct the server 104 to set the proper delay within the delay/synchronization functional block 244.

A third method is for the server 104 to timestamp the audio stream. By adjusting when audio is pulled out of a buffer on the user device 103, the user device 103 assures that the audio stream is lip sync'd to the video stream. Each server 104 may be calibrated for the delay in the video path and to assure that the server 104 and the application use the same time reference.

A fourth method is for the server 104 to transmit a low resolution, but lip sync'd, version of the video stream to the application. The application then uses the camera on the user device 103 to observe the display device 101 and correlate it to the video image it received. The application then calculates the relative video path delay by observing at what time shift the maximum correlation occurs and uses that to control the buffer delay.

In some embodiments, the video and audio streams may be synchronized within the following specs: Sara Kudrle et. al. (July 2011). "Fingerprinting for Solving A/V Synchronization Issues within Broadcast Environments". Motion Imaging Journal (SMPTE). This reference states, "Appropriate A/V sync limits have been established and the range that is considered acceptable for film is +/−22 ms. The range for video, according to the ATSC, is up to 15 ms lead time and about 45 ms lag time." In some embodiments, however, a lag time up to 150 ms is acceptable. It shall be appreciated that it may happen for the audio stream to lead the video stream by more than these amounts. In a typical display device 101 that has audio capabilities, the audio is delayed appropriately to be in sync with the video, at least to the extent that the original source is in sync.

In some embodiments, problems may arrive when the audio stream is separated from the video stream before reaching the display device 101 and put through, for instance, a separate audio system. In that case, the audio stream may significantly lead the video stream. To fix this, a variety of vendors offer products, e.g., the Hall Research AD-340™ or the Felston DD740™, that delay the audio by an adjustable amount. Additionally, the HDMI 1.3 specification also offers a lip sync mechanism.

Some embodiments of the present invention experience one or more additional delays. For example, there may be substantial delays in the WAPs 228 or network access points 105 as well as in the execution of the application on the user devices 103. For instance, Wi-Fi latency may vary widely depending on the number of user devices 103, interference sources, etc. On the user devices 103, processing latency may depend on whether or not the user device 103 is in power save mode or not. Also, some user devices 103 may provide multiprocessing, so the load on the processor can vary. In some embodiments, therefore, it is likely that the latency of the audio path will be larger than that of the video path.

In some embodiments, the overall system (e.g. 101 and 103-105) may keep the audio delay sufficiently low so that delaying the video is unnecessary. In some embodiments, for example, WEP or WPA encryption may be turned off. In other embodiments, the user device 103 is kept out of any power save mode.

The overall system (e.g. 101 and 103-105) in some embodiments provides a sync solution without delaying the video signal. For example, the server 104 separates the audio stream before it goes to the display devices 101 so that the video delay is in parallel with the audio delay. When synchronizing, the server 104 takes into consideration that the audio stream would have been additionally delayed if inside the display device 101 so that it is in sync with the video stream. Thus, any extra audio delay created by the network access points 105 and the user device 103 would be in parallel with the video delay.

In some embodiments, the video stream may be written into a frame buffer in the video processing functional block 232 that holds a certain number of video frames, e.g. up to 10-20 frames. This buffer may cause a delay that may or may not be fixed. The server 104 may further provide a variable delay in the audio path so that the audio and video streams can be equalized. Additionally, the server 104 may keep any variation in latency within the network access point 105 and the user device 103 low so that the audio delay determination is only needed once per setup.

In some embodiments, the overall system (e.g. 101, 103-105) addresses interference and moving the user device 103 out of power save mode. In some cases, the delay involved with WEP or WPA security, may be acceptable assuming that it is relatively fixed or assisted by special purpose hardware in the user device 103.

If the audio or video delay is too variable, some embodiments of the overall system (e.g. 101, 103-105) provides alternatively or additionally another mechanism for synchronization. The overall system (e.g. 101, 103-105) may utilize solutions known in the VoIP (voice over Internet protocol) or streaming video industries. These solutions dynamically adjust the relative delay of the audio and video streams using, for instance, timestamps for both data streams. They generally involve an audio data buffer in the user device 103 with flow control and a method for pulling the audio stream out of the buffer at the right time (as determined by the time stamps) and making sure that the buffer gets neither too empty nor too full through the use of flow control. In addition or in the alternative, the overall system (e.g. 101, 103-105) may perform more or less compression on the audio depending on the average available bandwidth.

The audio encoding functions at 245 (sometimes called codecs) generally encode and/or compress the audio streams (using time slicing if multiplexed) into a proper format (e.g. MP3, MPEG-4, AAC (E)LD, HE-AAC, S/PDIF, etc.) for use by the user devices 103. (The degree of audio compression may be adaptive to the environment 100.) Additionally, the packetization functions at 246 generally appropriately packetize the encoded audio streams for transmission through the network I/O adapter 240 and the WAPs 228 or network access points 105 to the user devices 103, e.g. with ADTS (Audio Data Transport Stream), a channel number and encryption if needed.

In this example, the server 104 also has a user or application interaction functional block 247. These functions generally include those not involved directly with the audio streams. For example, the interaction functions at 247 may include login and register functional blocks 248 and 249, respectively. The login and register functions at 248 and 249 may provide the screens 120, 125 and 134 (FIGS. 4, 5 and 6, respectively) to the user devices 103 and the underlying functions associated therewith for the users 102 to sign up or login to the servers 104, as described above.

In this example, the interaction functions at 247 may include a settings functional block 250. The settings functions at 250 may provide the screens 166, 170 and 174 (FIGS. 11, 12 and 13, respectively) to the user devices 103 and the underlying functions associated therewith for the users 102 to set various options for the application as they relate to the servers 104, including storing setting information and other functions described above. (Some of the underlying functions associated with the screens 166, 170 and 174, however, may be performed within the user devices 103 without interaction with the servers 104.)

In this example, the interaction functions at 247 may include a display list functional block 251. The display list functions at 251 may provide a list of available display devices 101 to the user devices 103 for the user devices 103 to generate the display device selection screen 159 shown in FIG. 8 and the language pop-up window 164 shown in FIG. 9.

In this example, the interaction functions at 247 may include a display selection functional block 252. When the user 102 selects a display device 101 from the display device selection screen 159 shown in FIG. 8, the display selection functions at 252 may control the channel selection/tuning functions at 238, the inputs 229-231, the tuners at 236 and the audio processing functions at 239 as necessary to produce the audio stream corresponding to the selected display device 101.

In this example, the interaction functions at 247 may include a content change request functional block 253. The content change request functions at 253 generally enable the users 102 to request that the TV channel or video content being provided over one of the display devices 101 to be changed to something different. The application on the user devices 103 may provide a screen option (not shown) for making a content change request. Then a pop-up window (not shown) may be provided to other user devices 103 that are receiving the audio stream for the same display device 101. The pop-up window may allow the other users 102 to agree or disagree with the content change. If a certain percentage of the users 102 agree, then the change may be made to the selected display device 101. The change may be automatic through the display selection functions at 252, or a manager or other person within the environment 100 may be alerted (e.g. with a text message through a multifunctional mobile device carried by the person) to make the change. By having the manager or other person within the environment 100 make the change, the owner/operator of the environment 100 may limit inappropriate public content within the environment 100 and may choose video streams that would attract the largest clientele. In either case, it may be preferable not to allow the users 102 to change the video content of the display devices 101 (or otherwise control the display devices 101) without approval in order to prevent conflicts among users 102.

In this example, the interaction functions at 247 may include a hot spot functional block 254. The hot spot functions at 254 may allow the users 102 to use the servers 104 and network access points 105 as a conventional Wi-Fi "hot spot" to access other resources, such as the Internet. The bandwidth made available for this function may be limited in order to ensure that sufficient bandwidth of the servers 104 and the network access points 105 is reserved for the audio streaming, food/drink ordering and social interaction functions within the environment 100.

In this example, the interaction functions at 247 may include a menu order functional block 255. The menu order functions at 255 may provide the screen options and underlying functions associated with the food and drink ordering functions described above with reference to FIGS. 14-18. A list of available menu items and prices for the environment 100 may, thus, be maintained within the menu order functional block 255.

In this example, the interaction functions at 247 may include a web server functional block 256. The web server functions at 256 may provide web page files in response to any conventional World Wide Web access requests. This function may be the means by which data is provided to the user devices 103 for some or all of the functions described herein. For example, the web server functional block 256 may provide a web page for downloading the application for the user devices 103 or an informational web page describing the services provided. The web pages may also include a restaurant or movie review page, a food/beverage menu, advertisements for specials or upcoming features. The web pages may be provided through the network access points 105 or through the Internet, e.g. through a network I/O adapter 257.

The network I/O adapter 257 may be an Ethernet or USB port, for example, and may connect the server 104 to other servers 104 or network devices within the environment 100 or off premises. The network I/O adapter 257 may be used to download software updates, to debug operational problems, etc.

In this example, the interaction functions at 247 may include a pop ups functional block 258. The pop ups functions at 258 may send data to the user devices 103 to cause the user devices 103 to generate pop up windows (not shown) to provide various types of information to the users 102. For example, drink specials may be announced, or a notification of approaching closing time may be given. Alternatively, while the user 102 is watching and listening to a particular program, trivia questions or information regarding the program may appear in the pop up windows. Such pop ups may be part of a game played by multiple users 102 to win free food/drinks or loyalty points. Any appropriate message may be provided as determined by the owner/operator of the environment 100 or of the servers 104.

In this example, the interaction functions at 247 may include an alter audio stream functional block 259. The alter audio stream functions at 259 may allow the owner, operator or manager of the environment 100 to provide audio messages to the users 102 through the user devices 103. This function may interrupt the audio stream being provided to the user devices 103 for the users 102 to watch the display devices 101. The existing audio stream may, thus, be temporarily muted in order to provide an alternate audio stream, e.g. to announce drink specials, last call or closing time. The alter audio stream functional block 259 may, thus, control the audio processing functions at 239 to allow inserting an alternate audio stream into the existing audio stream. Furthermore, the alter audio stream functions at 259 may detect when a commercial advertisement has interrupted a program on the display devices 101 in order to insert the alternate audio stream during the commercial break, so that the program is not interrupted.

In this example, the interaction functions at 247 may include an advertisement content functional block 260. The advertisement content functions at 260 may provide the alternate audio streams or the pop up window content for advertisements by the owner/operator of the environment 100 or by beverage or food suppliers or manufacturers or by other nearby business establishments or by broad-based regional/national/global business interests. The advertisements may be personalized using the name of the user 102, since that information may be provided when signing up or logging in, and/or appropriately targeted by the type of environment 100. Additionally, the servers 104 may monitor when users 102 enter and leave the environment 100, so the owners/operators of the environment 100 may tailor advertised specials or programs for when certain loyal users 102 are present, as opposed to the general public. In some embodiments, the servers 104 may offer surveys or solicit comments/feedback from the users 102 or announce upcoming events.

Other functions not shown or described may also be provided. For example, the servers 104 may provide data to the user devices 103 to support any of the other functions described herein. Additionally, the functions of the servers 104 may be upgraded, e.g. through the network I/O adapter 257.

Figure 21:
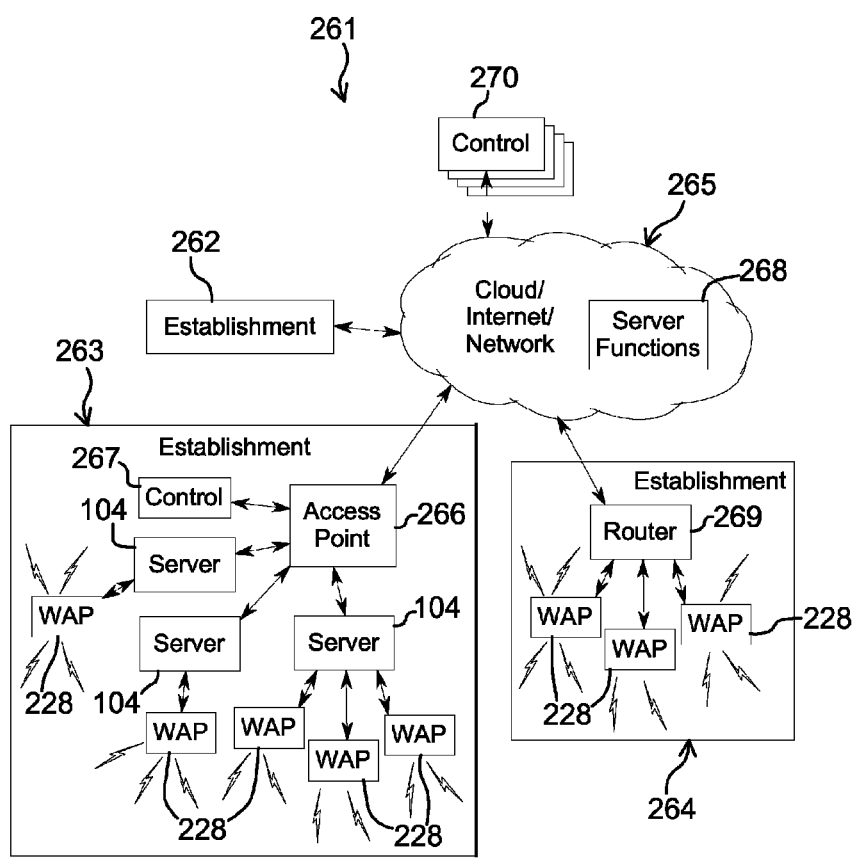
FIG. 21 is a simplified schematic diagram of a network incorporating the environment shown in FIG. 1 in accordance with an embodiment of the present invention.

An example overall network 261, in accordance with an embodiment of the present invention, that may include multiple instances of the environment 100 is shown in FIG. 21. The example network 261 generally includes multiple environments 100 represented by establishments 262, 263 and 264 connected to a cloud computing system or the Internet or other appropriate network system (the cloud) 265. Some or all of the controls or data for functions within the establishments 262-264 may originate in the cloud 265.

The establishment 263 generally represents embodiments in which some or all of the functions of the servers 104 are placed within the environment 100. In this case, the establishment 263 generally includes one or more of the servers 104 and WAPs 228 (or network access points 105) on premises along with a network access point 266 for accessing the cloud 265. A control device 267 may be placed within the establishment 263 to allow the owner/operator/manager of the establishment 263 or the owner/operator of the servers 104 to control or make changes for any of the functions of the servers 104 and the WAPs 228.

The establishment 264 generally represents embodiments in which some or all of the functions of the servers 104 are placed within the cloud 265. In this case, a server functions functional block 268 is shown in the cloud 265 and a router 269 (or other network devices) is shown in the establishment 264. The server functions functional block 268 generally represents any physical hardware and software within the cloud 265 that may be used to provide any of the functions described herein (including, but not limited to, the functions described with reference to FIG. 20) for the establishment 264. For example, the audio streams, video streams or A/V streams may be provided through, or from within, the cloud 265, so the server functions at 268 process and transmit the audio streams (and optionally the video streams) as necessary to the establishment 264 through the router 269 and the WAPs 228 (or network access points 105) to the user devices 103 (and optionally the display devices 101) within the establishment 264.

One or more control devices 270 are shown connected through the cloud 265 for controlling any aspects of the services provided to the establishments 262-264, regardless of the placement of the server functions. For example, software upgrades may be provided through the control devices 270 to upgrade functions of the servers 104 or the application on the user devices 103. Additionally, the advertisement content may be distributed from the control devices 270 by the owner/operators of the server functions or by business interests providing the advertisements.

Although embodiments of the present invention have been discussed primarily with respect to specific embodiments thereof, other variations are possible. Various configurations of the described system may be used in place of, or in addition to, the configurations presented herein. For example, additional components may be included in circuits where appropriate. As another example, configurations were described with general reference to certain types and combinations of circuit components, but other types and/or combinations of circuit components could be used in addition to or in the place of those described.

Those skilled in the art will appreciate that the foregoing description is by way of example only, and is not intended to limit the present invention. Nothing in the disclosure should indicate that the present invention is limited to systems that have the specific type of devices shown and described. Nothing in the disclosure should indicate that the present invention is limited to systems that require a particular form of semiconductor processing or integrated circuits. In general, any diagrams presented are only intended to indicate one possible configuration, and many variations are possible. Those skilled in the art will also appreciate that methods and systems consistent with the present invention are suitable for use in a wide range of applications.

While the specification has been described in detail with respect to specific embodiments of the present invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

The invention claimed is:

1. A method comprising:
providing an application for downloading to a personal user device;
receiving, by the application, an image through a camera of the personal user device, wherein the image is of a video stream being presented on a display device, the display device is one of a plurality of video display devices within an environment, the video stream is one of a plurality of video streams that are being presented on the plurality of video display devices for simultaneous viewing within the environment;
transmitting, by the application to a server, the image, wherein the server provides a plurality of audio streams that are available for streaming through the personal user device, the plurality of audio streams corresponding to the plurality of video streams, and the server matches the image to the video stream to select an audio stream that is one of the plurality of audio streams and that corresponds to the video stream;
receiving, by the application, the one selected audio stream through a path, that includes a wireless link, from the at least one server and not receiving any remaining ones of the plurality of audio streams; and
providing, by the application, the one selected audio stream through a listening device included in or connected to the personal user device, the listening device being distinct from the plurality of video display devices.

2. The method of claim 1, further comprising the application placing an order for a beverage.

3. The method of claim 1, further comprising the application facilitating a game played within the environment.

4. The method of claim 1, further comprising the personal user device downloading the application.

5. The method of claim 1, further comprising the application registering or logging in with the server.

6. The method of claim 5, further comprising the application logging in with the server using an Internet-based social networking feature.

7. The method of claim 1, further comprising:
the application receiving an advertisement from the server; and
the application presenting the advertisement to a user.

8. The method of claim 7, further comprising:
the application presenting the advertisement to the user as an alternate audio stream.

9. The method of claim 1, further comprising:
the application providing the one selected audio stream through the listening device as a mono audio stream.

10. The method of claim 1, further comprising:
synchronizing the audio stream and the video stream.

11. The method of claim 1, further comprising the server receiving a login request from the personal user device.

12. The method of claim 11, wherein the login request is associated with an Internet-based social networking feature.

* * * * *